US012398623B2

(12) United States Patent
Netecke et al.

(10) Patent No.: US 12,398,623 B2
(45) Date of Patent: Aug. 26, 2025

(54) SYSTEMS AND METHODS FOR CONDITION MONITORING OF TOP DRIVE INTERNAL BLOWOUT PREVENTER VALVES

(71) Applicant: Schlumberger Technology Corporation, Sugar Land, TX (US)

(72) Inventors: Michael Raymond Netecke, Kristiansand (NO); Rogelio Cabrera, Kristiansand (NO); Nephtali Gonzalez, Kristiansand (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/693,558

(22) PCT Filed: Nov. 3, 2022

(86) PCT No.: PCT/US2022/048826
§ 371 (c)(1),
(2) Date: Mar. 20, 2024

(87) PCT Pub. No.: WO2023/081283
PCT Pub. Date: May 11, 2023

(65) Prior Publication Data
US 2024/0401435 A1  Dec. 5, 2024

Related U.S. Application Data

(60) Provisional application No. 63/276,585, filed on Nov. 6, 2021.

(51) Int. Cl.
*E21B 21/10* (2006.01)
*E21B 34/16* (2006.01)
*F16K 37/00* (2006.01)

(52) U.S. Cl.
CPC ............ *E21B 34/16* (2013.01); *E21B 21/106* (2013.01); *F16K 37/0083* (2013.01); *E21B 2200/04* (2020.05)

(58) Field of Classification Search
CPC .... E21B 21/106; E21B 34/16; E21B 2200/04; F16K 37/0083
See application file for complete search history.

(56) References Cited

U.S. PATENT DOCUMENTS

| 4,535,852 A | * | 8/1985 | Boyadjieff | E21B 21/106 |
| | | | | 175/218 |
| 5,507,467 A | * | 4/1996 | Mott | E21B 21/106 |
| | | | | 175/218 |

(Continued)

FOREIGN PATENT DOCUMENTS

| WO | WO-2015110248 A2 * | 7/2015 | ........... E21B 21/106 |
| WO | 2016060649 A1 | 4/2016 | |
| WO | 2017051032 A1 | 3/2017 | |

*Primary Examiner* — Matthew R Buck
(74) *Attorney, Agent, or Firm* — Jeffrey D. Frantz

(57) ABSTRACT

A system includes a top drive including a handling ring assembly including a main body, a main shaft that traverses the main body of the handling ring assembly, an internal blowout preventer (IBOP) valve, wherein the main shaft engages the IBOP valve, a two-piece actuator sleeve assembly including a non-rotating portion and a rotating portion, at least one hydraulic cylinder connected to the main body of the handling ring assembly, wherein the at least one hydraulic cylinder actuates the two-piece actuator sleeve assembly, and left and right hand crank assemblies having left and right wireless encoders connected thereto, wherein the crank assemblies with the wireless encoders are attached to, and are configured to rotate with, the IBOP valve along with the rotating portion of the two-piece actuator sleeve assembly.

15 Claims, 22 Drawing Sheets

(56) References Cited

U.S. PATENT DOCUMENTS

| | | | |
|---|---|---|---|
| 5,978,749 A | 11/1999 | Likins, Jr. | |
| 6,712,160 B1 | 3/2004 | Schultz | |
| 6,840,493 B2* | 1/2005 | York | F16K 31/122 251/250 |
| 7,108,081 B2* | 9/2006 | Boyadjieff | E21B 21/106 73/152.47 |
| 7,461,698 B2* | 12/2008 | Klipstein | E21B 3/022 175/218 |
| 7,925,472 B2 | 4/2011 | Nasr | |
| 8,347,957 B2 | 1/2013 | Stephenson | |
| 8,676,721 B2 | 3/2014 | Piovesan | |
| 9,260,943 B2 | 2/2016 | Eriksson | |
| 9,359,831 B2 | 6/2016 | Bradley | |
| 9,581,010 B2* | 2/2017 | Anderson | E21B 19/166 |
| 9,934,479 B2 | 4/2018 | Sanchez | |
| 10,215,009 B2 | 2/2019 | Tjostheim | |
| 10,221,674 B2 | 3/2019 | Samuel | |
| 10,400,511 B2 | 9/2019 | Netecke | |
| 11,060,361 B2 | 7/2021 | Berry | |
| 2002/0018399 A1 | 2/2002 | Schultz | |
| 2011/0203848 A1 | 8/2011 | Krueger | |
| 2013/0068479 A1 | 3/2013 | AlDossary | |
| 2014/0064029 A1 | 3/2014 | Jaffrey | |
| 2014/0121973 A1 | 5/2014 | Buchanan | |
| 2015/0022326 A1 | 1/2015 | Baxter | |
| 2015/0337599 A1 | 11/2015 | Bullock | |
| 2015/0356521 A1 | 12/2015 | Sridhar | |
| 2016/0292652 A1 | 10/2016 | Bowden, Jr. | |
| 2016/0371957 A1 | 12/2016 | Ghaffari | |
| 2017/0090457 A1 | 3/2017 | Pandurangan | |
| 2017/0152967 A1 | 6/2017 | Jaffrey | |
| 2017/0268323 A1 | 9/2017 | Dykstra | |
| 2017/0321484 A1* | 11/2017 | Dewald | G01L 5/0061 |
| 2018/0087342 A1 | 3/2018 | Gottlieb | |
| 2018/0238134 A1* | 8/2018 | Reyes | E21B 34/16 |
| 2018/0293551 A1 | 10/2018 | Buca | |
| 2018/0363421 A1 | 12/2018 | Harshbarger | |
| 2019/0120023 A1 | 4/2019 | Ocegueda-Hernandez | |
| 2020/0291767 A1 | 9/2020 | Kroslid | |
| 2020/0326375 A1 | 10/2020 | Camacho Cardenas | |
| 2021/0102530 A1 | 4/2021 | Pruitt | |
| 2021/0190177 A1* | 6/2021 | Süß | G01D 5/145 |

* cited by examiner

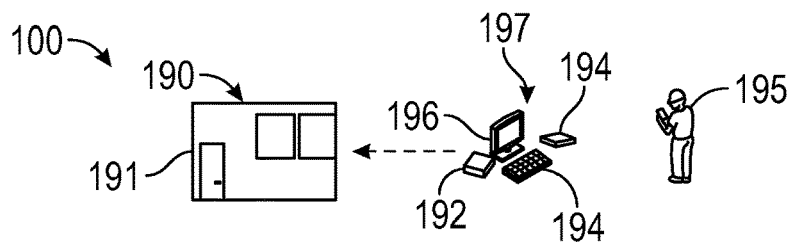
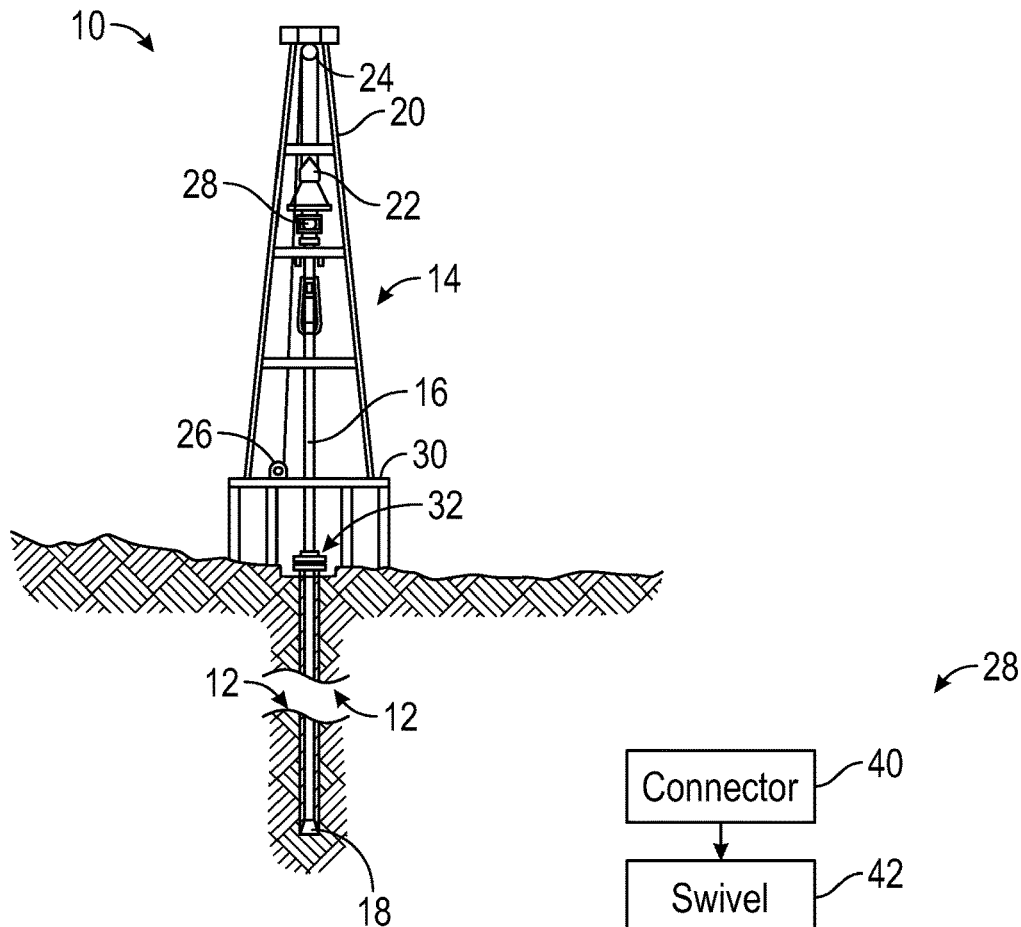
FIG. 1
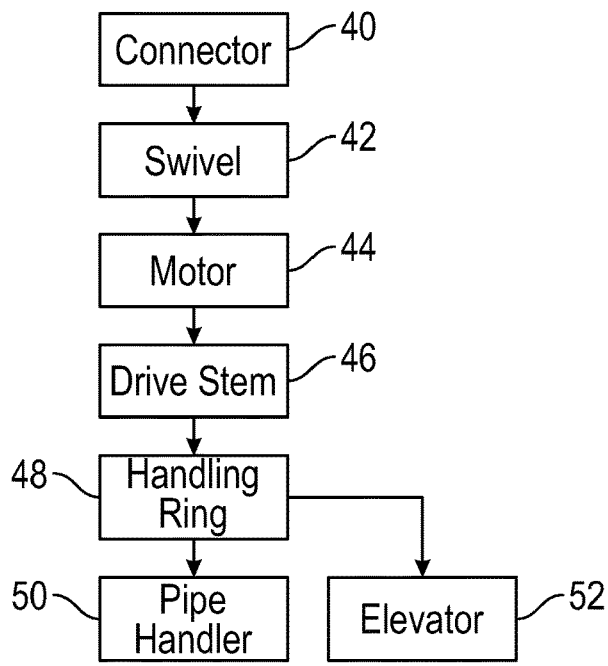
FIG. 2

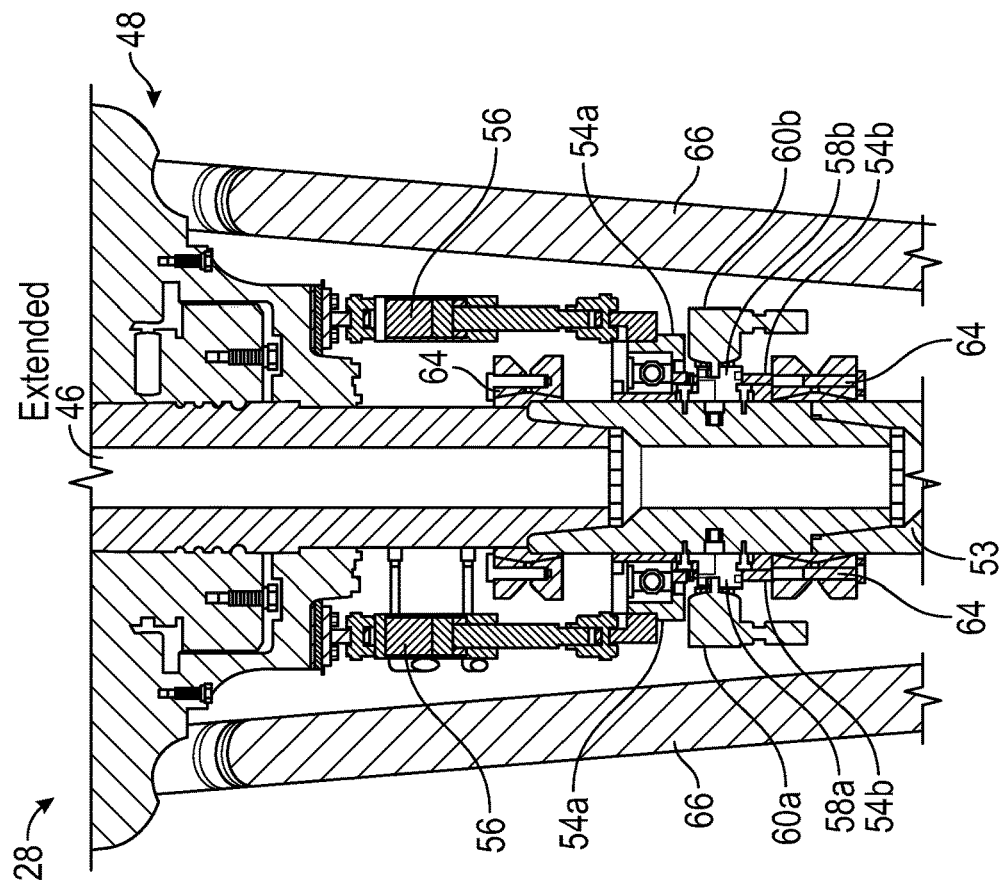
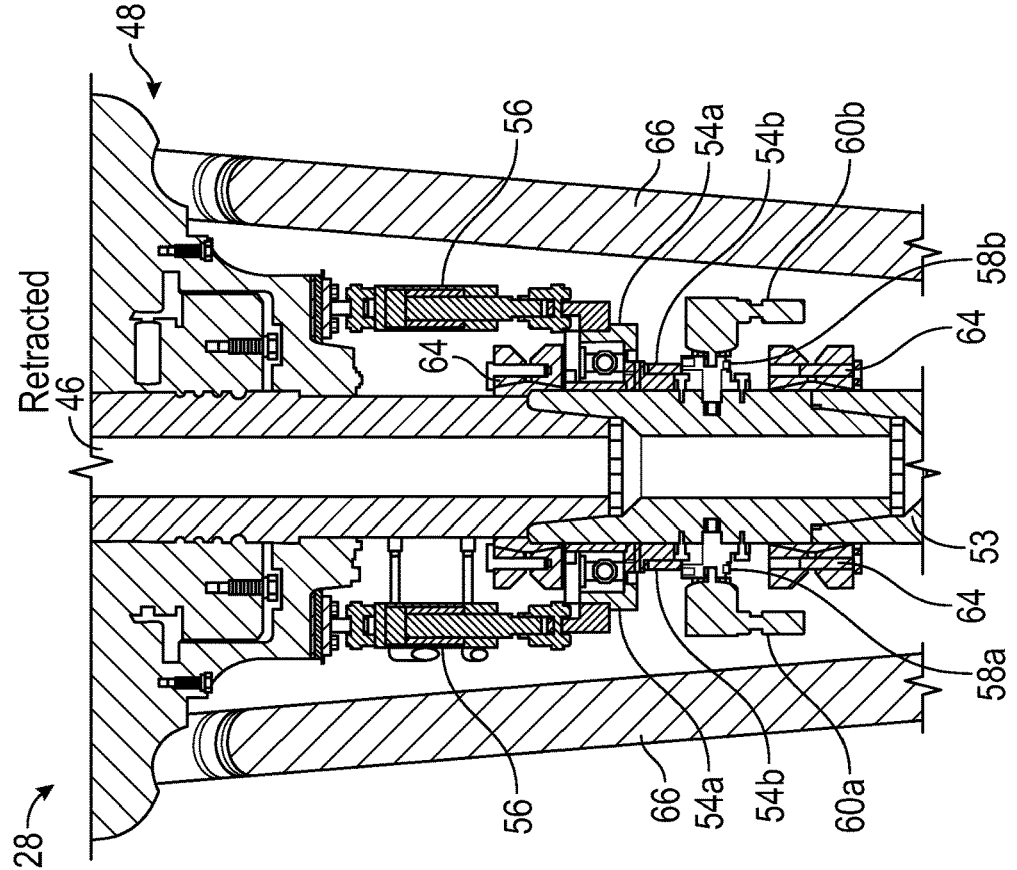

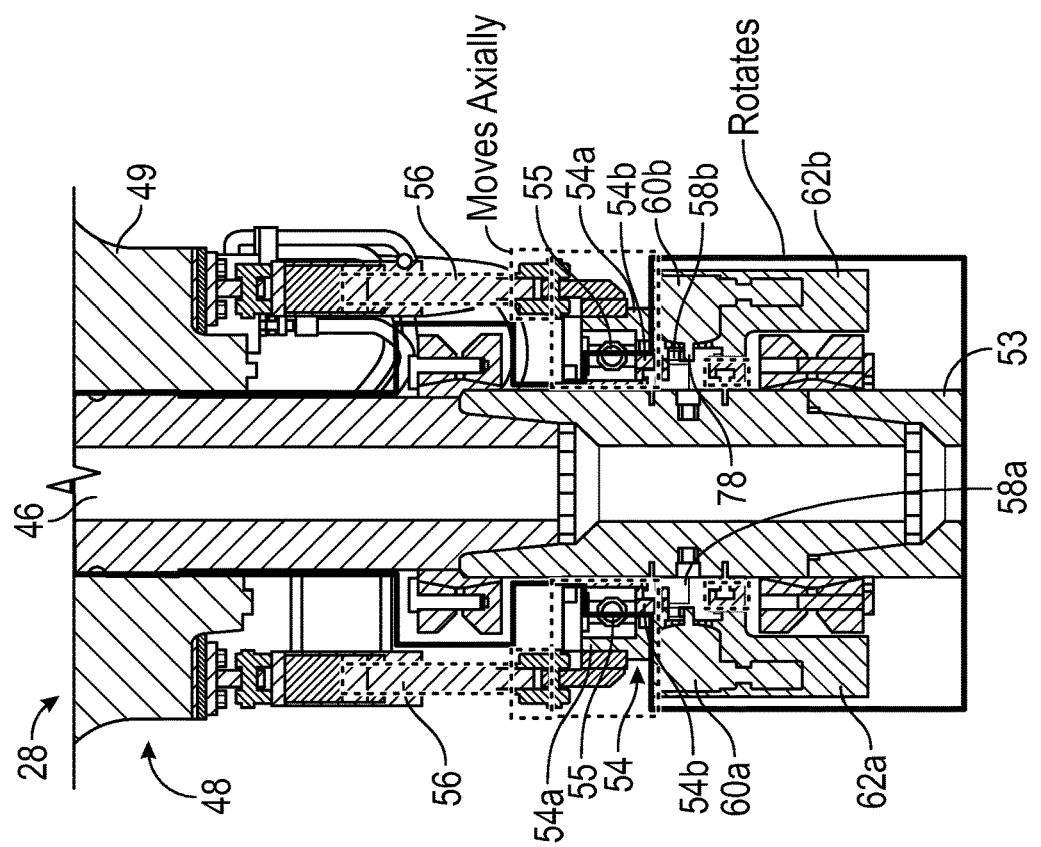
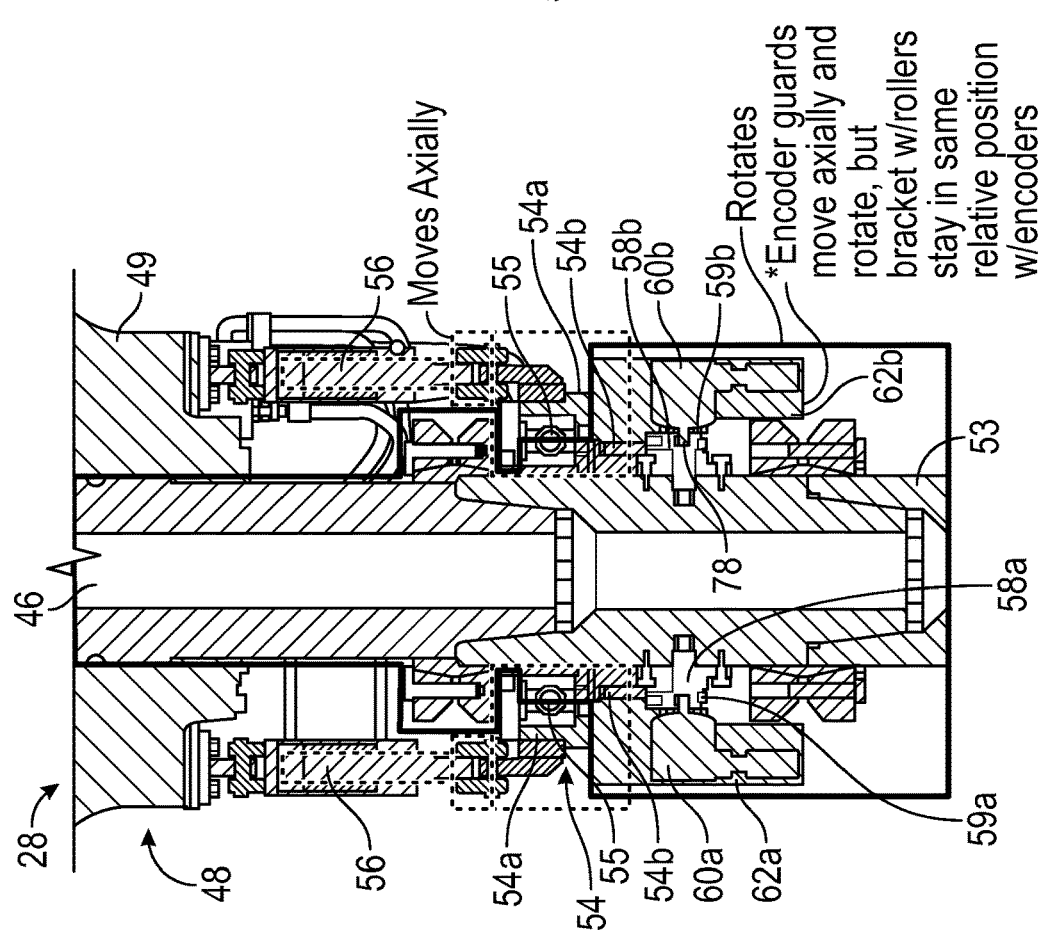
FIG. 13B
FIG. 13A

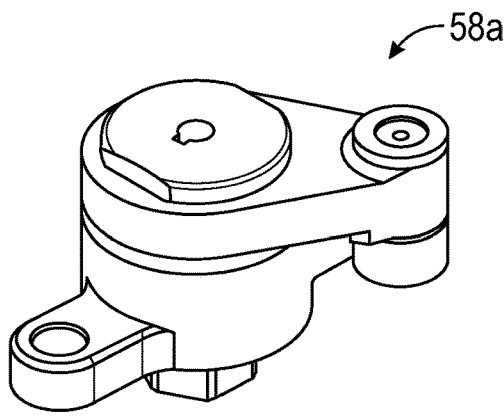 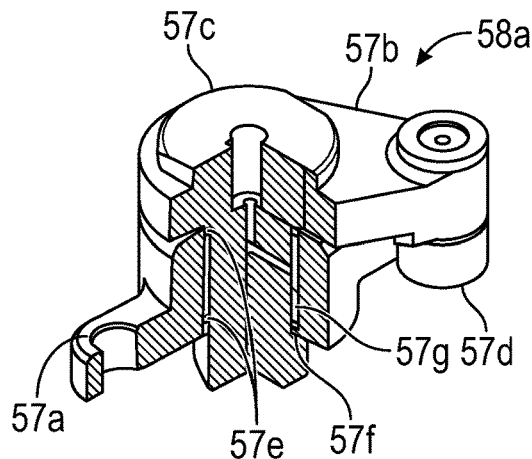
FIG. 14A    FIG. 14B
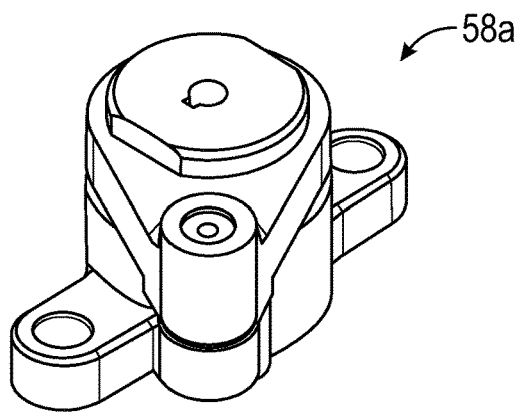
FIG. 14C
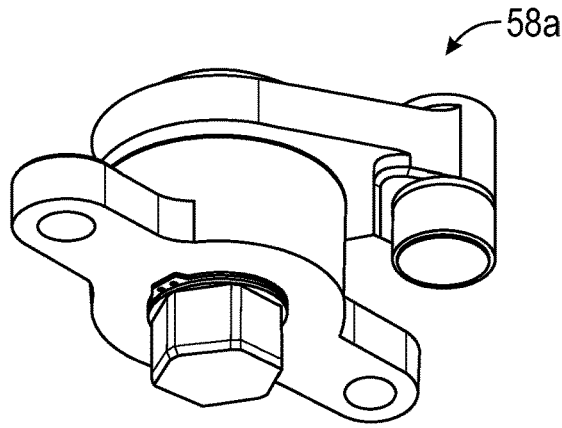 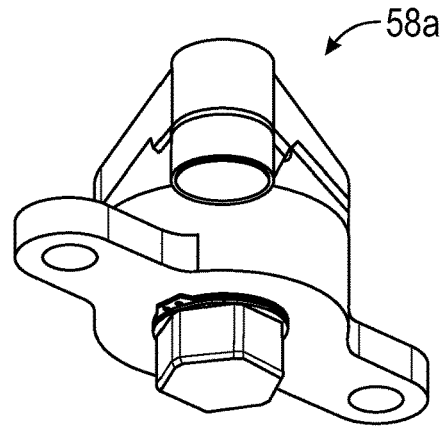
FIG. 14D    FIG. 14E

SYSTEMS AND METHODS FOR CONDITION MONITORING OF TOP DRIVE INTERNAL BLOWOUT PREVENTER VALVES

CROSS-REFERENCE TO RELATED APPLICATION

The present document is a National Stage Entry of International Application No. PCT/US2022/048826, filed Nov. 3, 2022, which is based on and claims priority to U.S. Provisional Patent Application No. 63/276,585, filed Nov. 6, 2021, which is incorporated herein by reference in its entirety.

BACKGROUND

Top drives, which are drilling machines suspended from a block and tackle arrangement in a mast/derrick of a drilling rig, perform many functions related to rotary drilling. One of the primary functions of the top drive is to serve as a conduit for drilling fluid, which enters the top drive through a rotary drilling hose from a high-pressure mud standpipe, which then passes through a rotary seal called a washpipe, then into a bore of a main shaft of the top drive, and then down into the wellbore through the drilling tubular.

A valve called an IBOP ("internal blowout preventer") is placed in line between the top drive main shaft and the drilling tubular. The IBOP is a high pressure ball valve that serves two primary functions: (1) closing off the path for drilling fluid during the connection of new tubulars (called a "mud saver" in this case), and (2) closing in the event of a "kick" (a type of loss of well control, where high pressure gas goes back up the drill string).

IBOP valves often have reduced lives because actuator designs are unable to ensure that the valves are fully open or fully closed for different reasons (i.e., lack of adjustment, incorrect travel, etc.). Replacing an IBOP valve is a time consuming and difficult task, and new valves are expensive. Accordingly, there is a need to improve the life of IBOP valves and track valve degradation so that total valve failure can be anticipated and planned for, rather than merely reacted to.

SUMMARY

A system according to one or more embodiments of the present disclosure includes, a top drive including a handling ring assembly including a main body, a main shaft that traverses the main body of the handling ring assembly, an internal blowout preventer valve, wherein the main shaft engages the internal blowout preventer valve, a two-piece actuator sleeve assembly including a non-rotating portion and a rotating portion, at least one hydraulic cylinder connected to the main body of the handling ring assembly, wherein the at least one hydraulic cylinder actuates the two-piece actuator sleeve assembly, a left hand crank assembly having a left wireless encoder connected thereto, and a right hand crank assembly having a right wireless encoder connected thereto, wherein the crank assemblies with the wireless encoders are attached to, and are configured to rotate with, the internal blowout preventer valve along with the rotating portion of the two-piece actuator sleeve assembly.

A system for condition monitoring an internal blowout preventer valve of a top drive, the system including a crank assembly that interfaces with a ball valve inside a body of the internal blowout preventer valve, a wireless encoder connected to the crank assembly via a crank/encoder interface, a processing device communicatively connected with the wireless encoder, and a human machine interface that visually displays position measurement data calculated by the processing device.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 1 generally depicts a well construction system including a drilling system having a top drive according to one or more embodiments of the present disclosure;

FIG. 2 is a block diagram of various components of a top drive according to one or more embodiments of the present disclosure;

FIGS. 10A and 10B are zoomed in section views of certain components of a top drive in retracted and extended positions including an IBOP valve, according to one or more embodiments of the present disclosure;

FIGS. 13A and 13B show zoomed in section views of movement of certain components of a top drive in retracted and extended positions, according to one or more embodiments of the present disclosure;

FIG. 14A shows a perspective view of a crank assembly rotated in a first direction, according to one or more embodiments of the present disclosure;

FIG. 14B shows a partial cutaway view of the crank assembly shown in FIG. 14A, according to one or more embodiments of the present disclosure;

FIG. 14C shows a perspective view of a crank assembly rotated in a second direction, according to one or more embodiments of the present disclosure;

FIGS. 14D and 14E show bottom perspective views of a crank assembly rotated in the first direction and the second direction, respectively, according to one or more embodiments of the present disclosure;

DETAILED DESCRIPTION

Figure 3A:
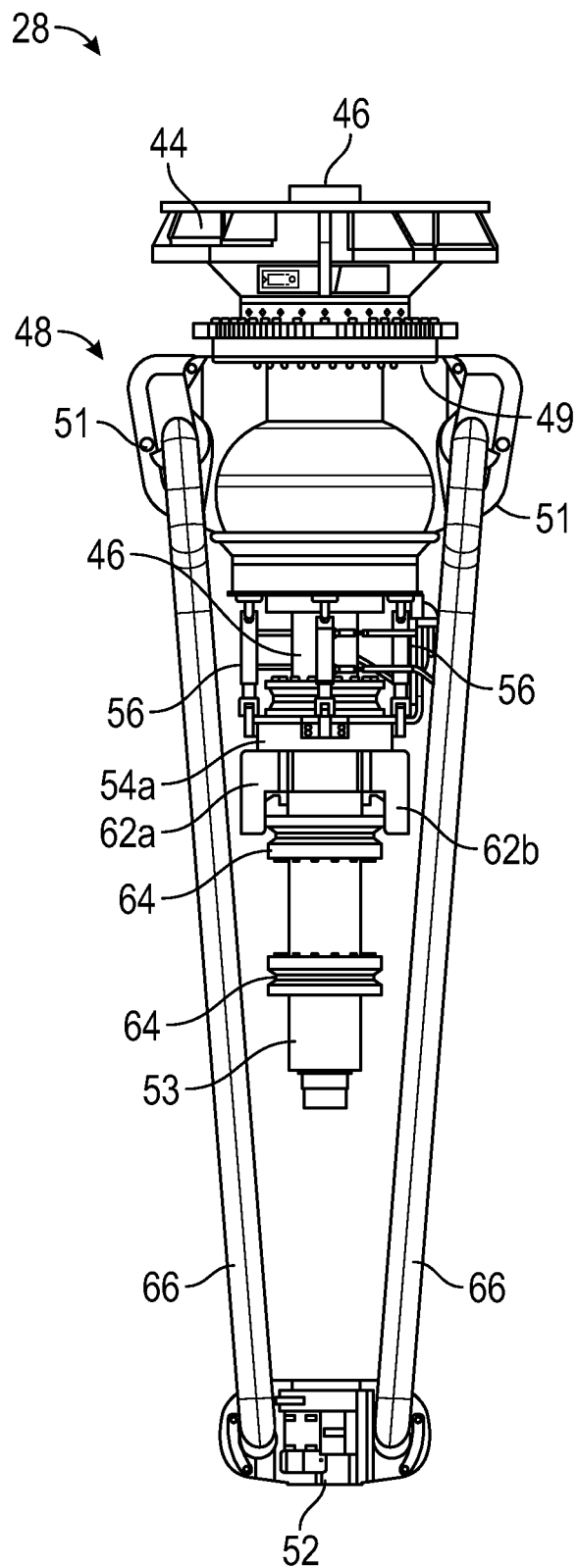
FIGS. 3A and 3B are front views of certain components of a top drive in retracted and extended positions including an IBOP valve with some components covered in operation, according to one or more embodiments of the present disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

In the specification and appended claims, the terms "connect," "connection," "connected," "in connection with," and "connecting," are used to mean "in direct connection with," in connection with via one or more elements." The terms "couple," "coupled," "coupled with," "coupled together," and "coupling" are used to mean "directly coupled together," or "coupled together via one or more elements." The term "set" is used to mean setting "one element" or "more than one element." As used herein, the terms "up" and "down," "upper" and "lower," "upwardly" and "downwardly," "upstream" and "downstream," "uphole" and "downhole," "above" and "below," "top" and "bottom," and other like terms indicating relative positions above or below a given point or element are used in this description to more clearly describe some embodiments of the disclosure. Commonly, these terms relate to a reference point at the surface from which drilling operations are initiated as being the top point and the total depth being the lowest point, wherein the well (e.g., wellbore, borehole) is vertical, horizontal, or slanted relative to the surface.

The present disclosure generally relates to top drive IBOP valves. More specifically, one or more embodiments of the present disclosure are related to condition monitoring of top drive IBOP valves. Condition monitoring is a process of monitoring equipment condition indicators for changes to identify future faults, failures, breakdowns, and other maintenance problems associated with equipment. Condition monitoring is increasingly utilized in the oil and gas industry as part of predictive maintenance of wellsite (e.g., drilling) equipment. Condition monitoring utilizes condition data generated by peripheral (e.g., add-on) sensors and instruments to gain more insight to future maintenance problems. Condition data, such as vibration data, acoustic data, thermographic (e.g., infrared signature) data, is used solely to indicate condition of equipment. Condition monitoring also includes analyzing operational data to determine amount of equipment usage and compare the determined equipment usage to expected operational lifetime specifications and/or calculations. According to one or more embodiments of the present disclosure, condition monitoring may be used determine whether a top drive IBOP valve is fully open or fully closed so as to not wash out the valve during drilling operations. Condition monitoring may also be used to track degradation of the valve, for example. With respect to condition monitoring, this disclosure is related to U.S. Patent Application Publication No. 2020/0291767, entitled "PERFORMANCE BASED CONDITION MONITORING," the disclosure of which is incorporated herein by reference in its entirety.

Most top drives are equipped with two IBOP valves for redundancy—one remotely operated, and one manually operated. These IBOP valves are typically metal-to-metal seal ball valves with a 90° range of motion. At one extent, the IBOP valve will be fully closed, and at the other, fully opened. Opening and closing fully is critical to long term life of the IBOP valve because of the type of fluid, the flow rates, and pressures associated with the application.

One or more embodiments of the present disclosure includes an IBOP actuator design that is simple to adjust and to operate. According to one or more embodiments of the present disclosure, the IBOP actuator design is equipped with wireless incremental encoders installed on the cranks of the valve, so that instantaneous valve position is always known, and can be tracked over time as the operating extent of the valve is progressively reduced by wear, damage, and other application specific factors.

Referring now to FIG. 1, a well construction system 100 including a drilling system 10 is shown according to one or more embodiments of the present disclosure. Notably, the system 10 may be operated to drill a well 12 to access a subterranean resource, such as oil or natural gas. As depicted, the system 10 includes an onshore drilling rig 14, although the system 10 could instead be an offshore system in other embodiments. The drilling rig 14 uses a drill string 16 and a drill bit 18 to form the well 12. It will be appreciated that the drill string 16 can include various members, such as drill pipes, tool joints, drill collars, and a saver sub that prevents wear on a threaded connection of a rotating system (e.g., a top drive) that drives rotation of the drill string 16.

The drilling rig 14 also includes a mast 20 and a hoisting system (here generally shown as including a traveling block 22, a crown block 24, and draw works 26) to enable a top drive 28 to be raised and lowered with respect to a drill floor 30. The drill string 16 is suspended from the top drive 28 through a hole in the drill floor 30 and through surface equipment (e.g., a blowout preventer 32 in the cellar). The drill string 16 can be rotated by the top drive 28 and can be raised and lowered with the top drive 28 (via the traveling block 22) to facilitate drilling operations.

Still referring to FIG. 1, the well construction system 100 may also include a control center 190 from which the top drive 28 may be monitored and controlled. The control center 190 may be located on the drill floor 30 or another location of the well construction system 100, such as a surface of the wellsite, for example. The control center 190 may include a facility 191 (e.g., a room, a cabin, a trailer, etc.) containing a control workstation 197, which may be operated by a human wellsite operator 195 to monitor and control various wellsite equipment or portions of the well construction system 100. The control workstation 197 may include or be communicatively connected with a processing device 192 (e.g., a controller, a computer, etc.), such as may be operable to receive, process, and output information to monitor operations of and provide control to one or more portions of the well construction system 100. For example, the processing device 192 according to one or more embodiments of the present disclosure may be communicatively connected with two wireless encoders installed in two crank assemblies of the top drive 28 as described herein, and may be operable to receive signals from and transmit signals to such equipment to perform various operation described herein. The processing device 192 may store executable program code, instructions, and/or operational parameters or set-points, including for implementing one or more aspects of methods and operations described herein. The processing device 192 may be located within and/or outside of the facility 191.

The control workstation 197 may be operable for entering or otherwise communicating control commands to the processing device 192 by the wellsite operator 195, and for displaying or otherwise communicating information from the processing device 192 to the wellsite operator 195. The control workstation 197 may include a plurality of human-machine interface (HMI) devices, including one or more input devices 194 (e.g., a keyboard, a mouse, a joystick, a touchscreen, etc.) and one or more output devices 196 (e.g., a video monitor, a touchscreen, a printer, audio speakers, etc.). Communication between the processing device 192, the input and output devices 194, 196, and the various wellsite equipment may be via wired and/or wireless communication means.

One example of a top drive 28 is generally depicted in FIG. 2. In this embodiment, the top drive 28 includes a connector 40 for attaching the top drive 28 to the traveling block 22. A drive stem 46 is suspended from a swivel 42 through a motor 44, which drives rotation of the drive stem 46 within the top drive 28. The drive stem 46 (which is sometimes referred to as a main shaft or a quill) can be connected to a drill string 16 to cause the drill string 16 to rotate along with the drive stem 46. The top drive 28 of FIG. 2 also includes a handling ring 48 connected to a pipe handler 50 and to an elevator 52.

Figure 3B:
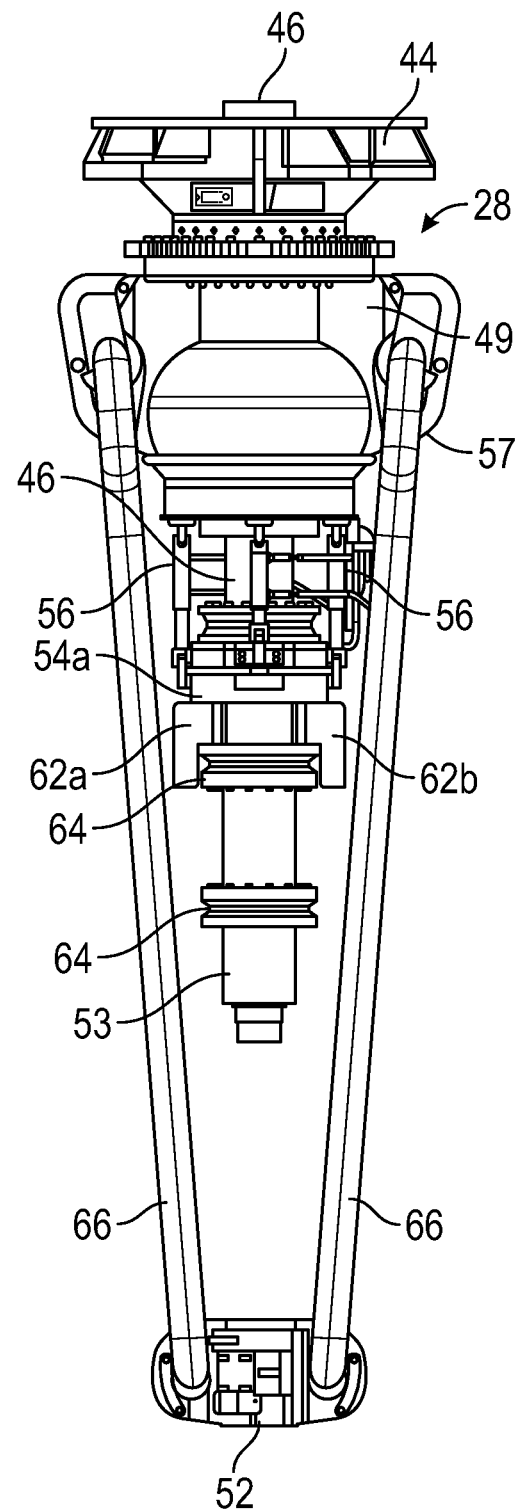

Referring now to FIGS. 3A and 3B, front views of certain components of a top drive 28 are shown, according to one or more embodiments of the present disclosure. Specifically, FIG. 3A shows the top drive 28 in a retracted position, and FIG. 3B shows the top drive 28 in an extended position, as further described below. As shown in FIGS. 3A and 3B, the top drive 28 includes a motor 44, as previously described, a handling ring assembly 48 including a main body 49, and a drive stem (or main shaft) 46 that traverses the main body 49 of the handling ring assembly 48. As shown in FIGS. 3A and 3B, in addition to the main body 49, the handling ring assembly 48 also includes arms 51. As further shown in FIGS. 3A and 3B, the top drive 28 also includes an internal blowout preventer (IBOP) valve 53, and the main shaft 46 of the top drive 28 engages with the IBOP valve 53, as further described below.

As also shown in FIGS. 3A and 3B, the top drive 28 also includes a pair of hydraulic cylinders 56, a two-piece actuator sleeve assembly 54, and a pair of guards or covers 62a, 62b, which conceal crank assemblies and connected wireless encoders, as further described below. As also shown in FIGS. 3A and 3B, the top drive 28 may include a plurality of tool joint safety clamps 64 disposed along the IBOP valve 53, for example. Moreover, the top drive 28 may include links 66 attached to the arms 51 of the handling ring assembly 48, and an elevator 52 connected to the links 66.

Figure 4A:
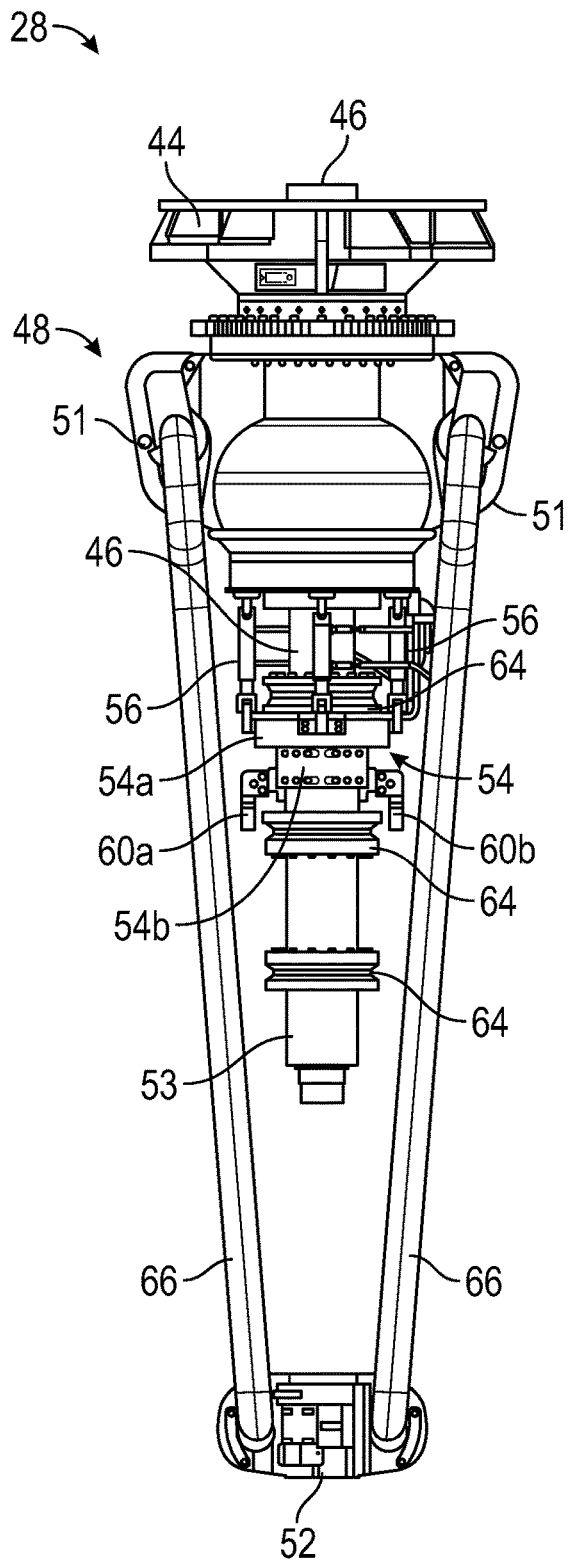
FIGS. 4A and 4B are front views of certain components of a top drive in retracted and extended positions including an IBOP valve with transparent covers revealing the components covered in FIGS. 3A and 3B, according to one or more embodiments of the present disclosure.
Figure 4B:
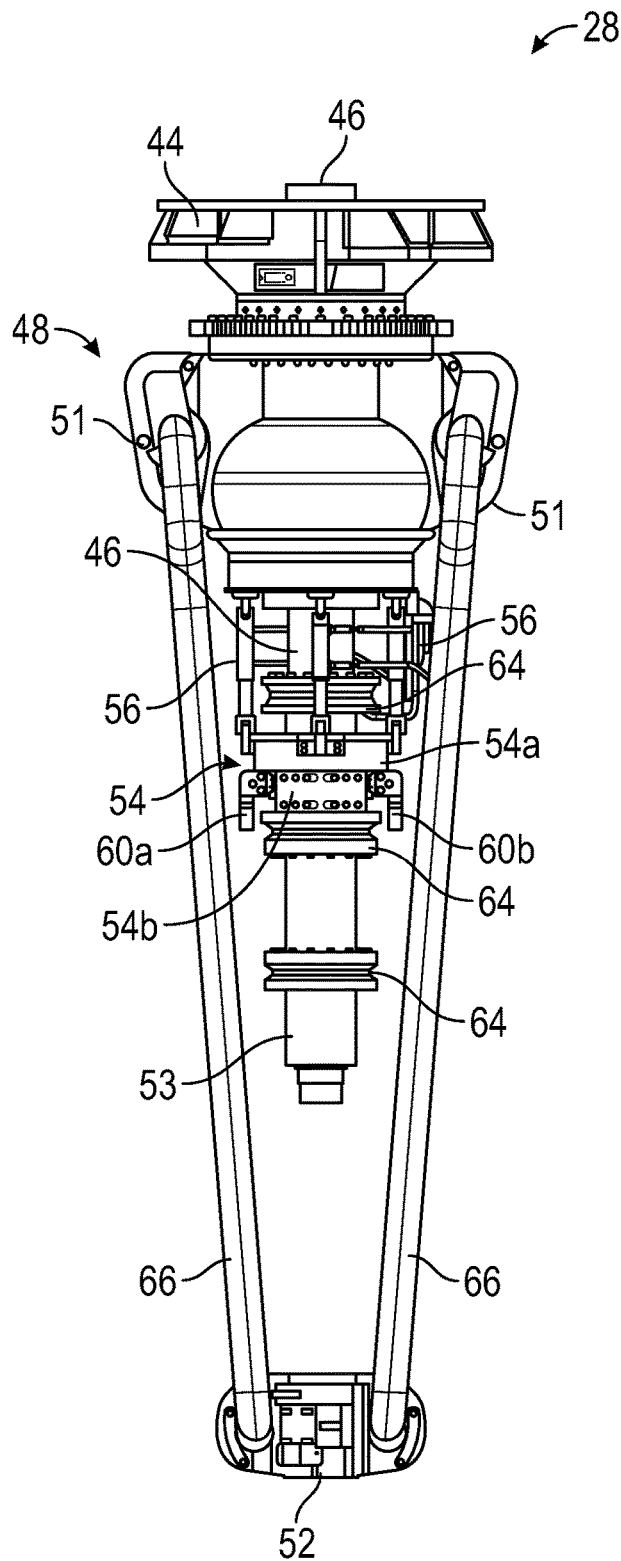

FIGS. 4A and 4B show front views of the same components of the top drive 28 shown in FIGS. 3A and 3B, for example. FIG. 4A shows the top drive 28 in a retracted position, and FIG. 4B shows the top drive 28 in an extended position, as further described below. In FIGS. 4A and 4B, however, the guards or covers 62a and 62b shown in FIGS. 3A and 3B are transparent, such that the left and right wireless encoders 60a, 60b are visible. As further described below, the left and right wireless encoders 60a, 60b are connected to corresponding left hand and right hand crank assemblies. FIGS. 4A and 4B also more clearly show the two pieces of the two-piece actuator sleeve assembly 54, which includes a non-rotating portion 54a and a rotating portion 54b, the operation of which are further described below.

Figure 5A:
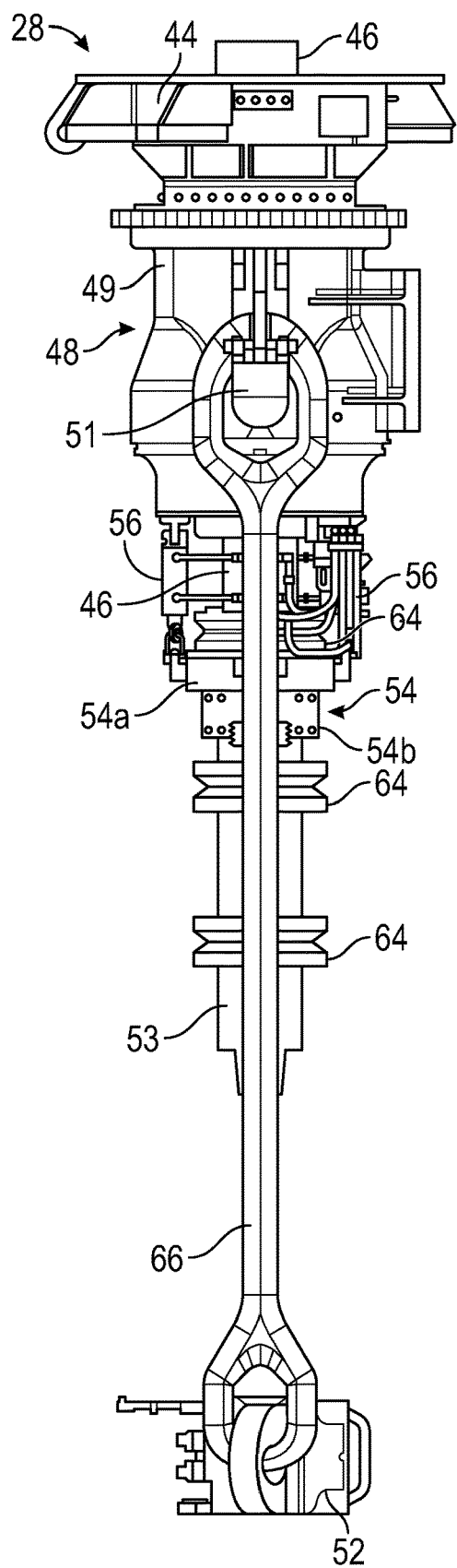
FIGS. 5A and 5B are side views of certain components of a top drive in retracted and extended positions including an IBOP valve with transparent covers, according to one or more embodiments of the present disclosure.
Figure 5B:
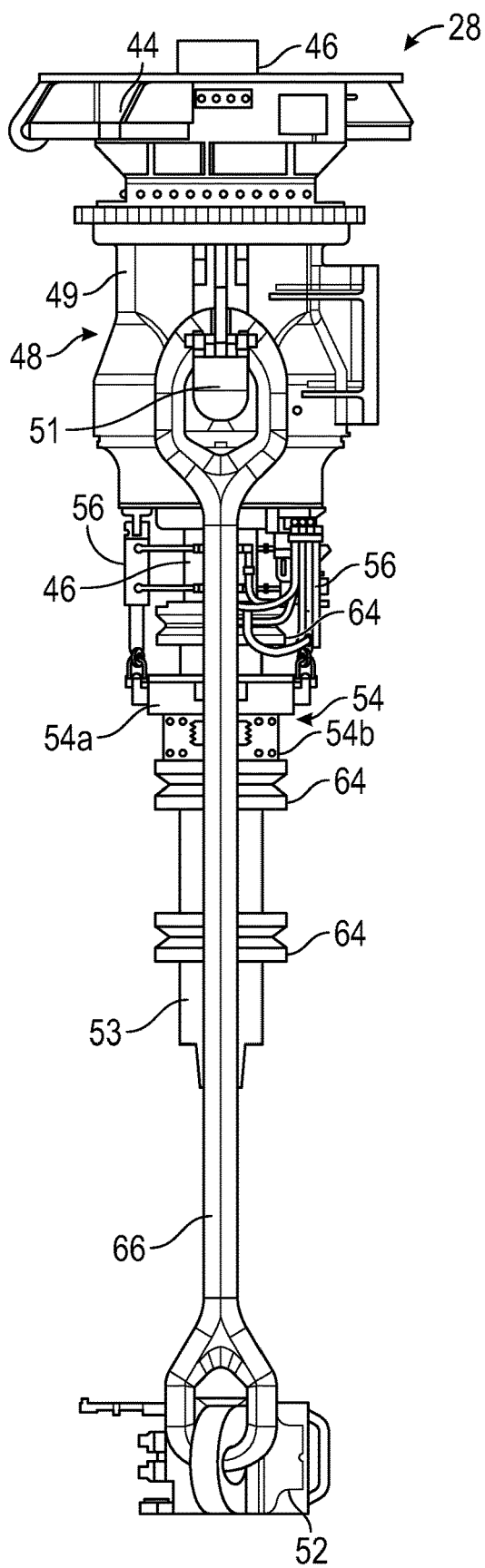

To provide additional views to facilitate understanding of one or more embodiments of the present disclosure, FIGS. 5A and 5B show side views of certain components of the top drive 28, as previously described in view of FIGS. 3A, 3B, 4A, and 4B, for example. Specifically, FIG. 5A shows the top drive 28 in a retracted position, and FIG. 5B shows the top drive 28 in an extended position, as further described below. Similar to FIGS. 4A and 4B, the side views of the top drive 28 shown in FIGS. 5A and 5B show transparent guards or covers 62a and 62b to enhance visibility of the non-rotating portion 54a and the rotating portion 54b of the two-piece actuator sleeve assembly 54, for example. Even with transparent guards or covers 62a, 62b, however, in the side views shown in FIGS. 5A and 5B, the links 66 of the top drive 28 obstruct the view of the left and right wireless encoders 60a, 60b, which are connected to corresponding left hand and right hand crank assemblies, as further described below. With respect to FIGS. 5A and 5B, like components of the top drive 28 are labeled with like reference numerals, as previously described.

Figure 6A:
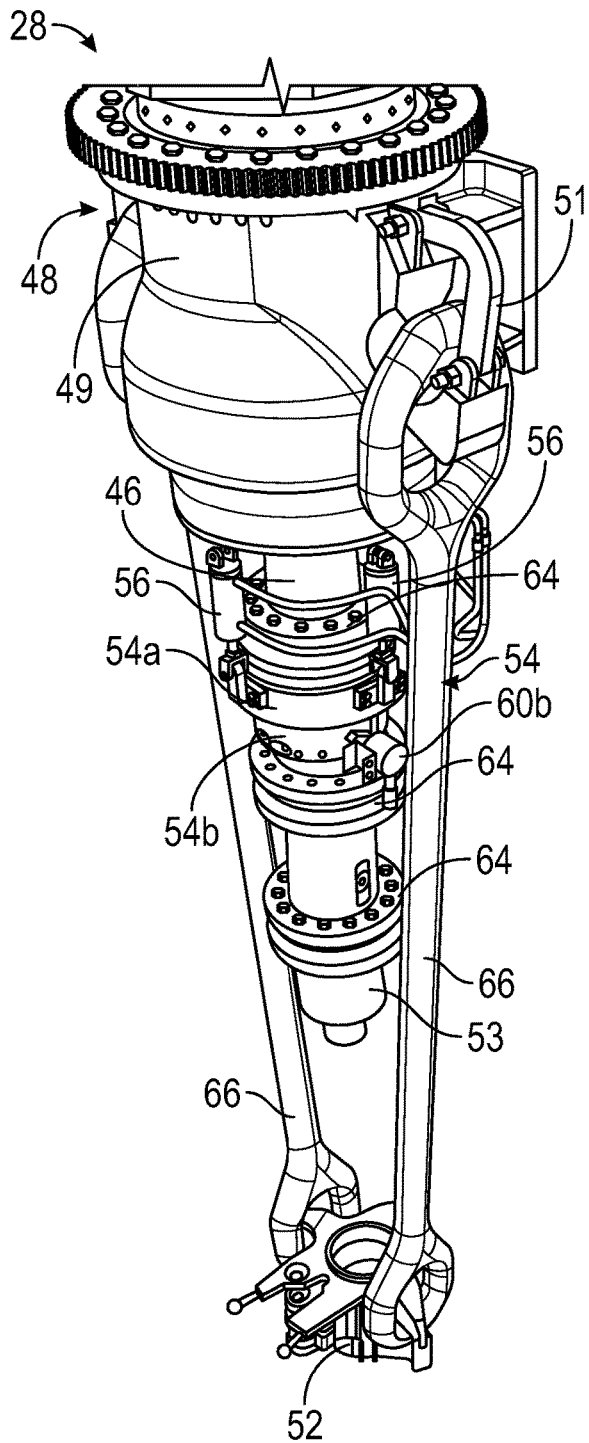
FIGS. 6A and 6B are isometric views of certain components of a top drive in retracted and extended positions including an IBOP valve, according to one or more embodiments of the present disclosure.
Figure 6B:
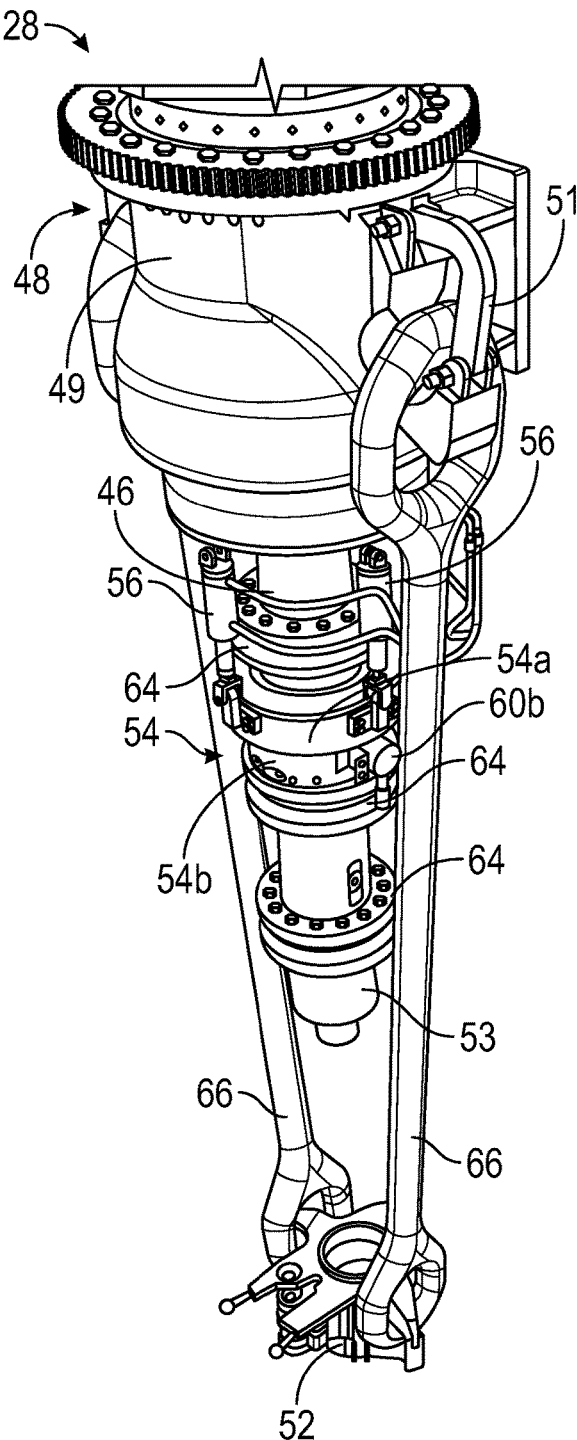
Figure 7A:
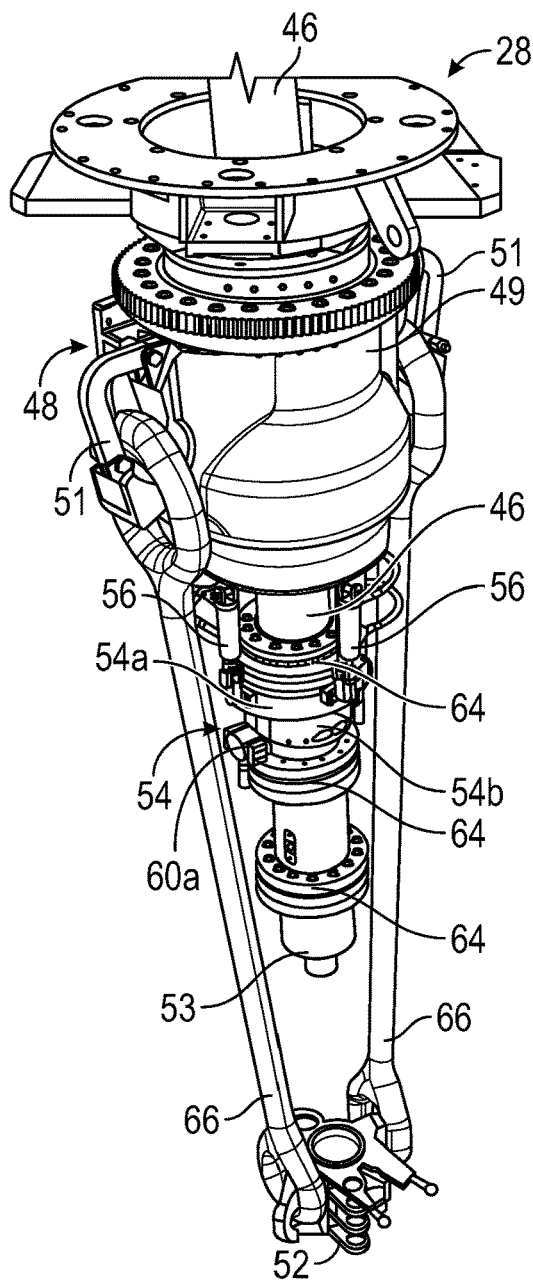
FIGS. 7A and 7B are additional isometric views of certain components of a top drive in retracted and extended positions including an IBOP valve, according to one or more embodiments of the present disclosure.
Figure 7B:
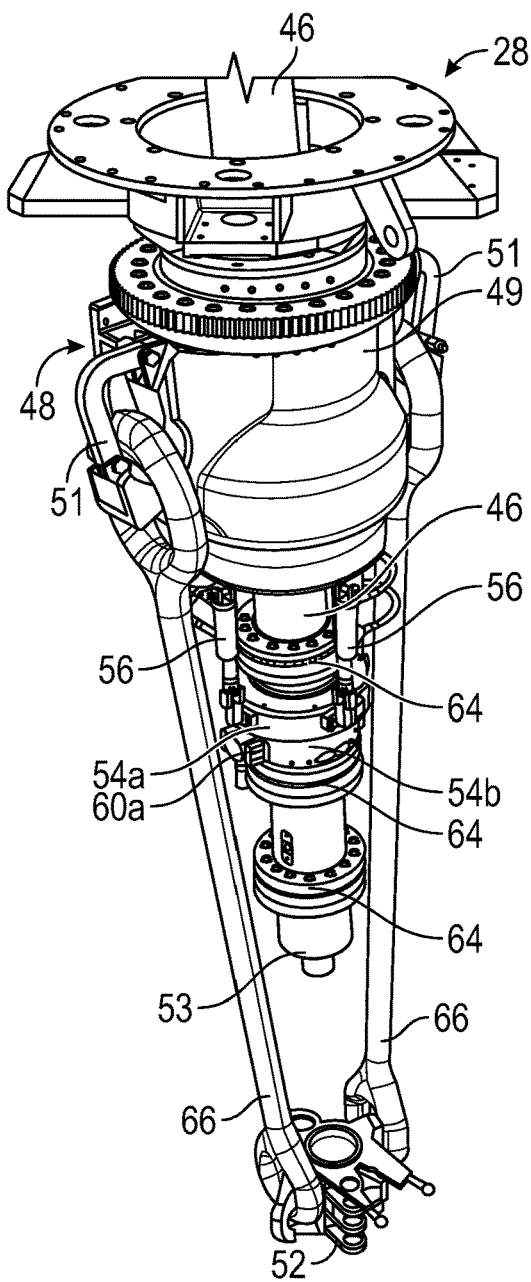
Figure 8A:
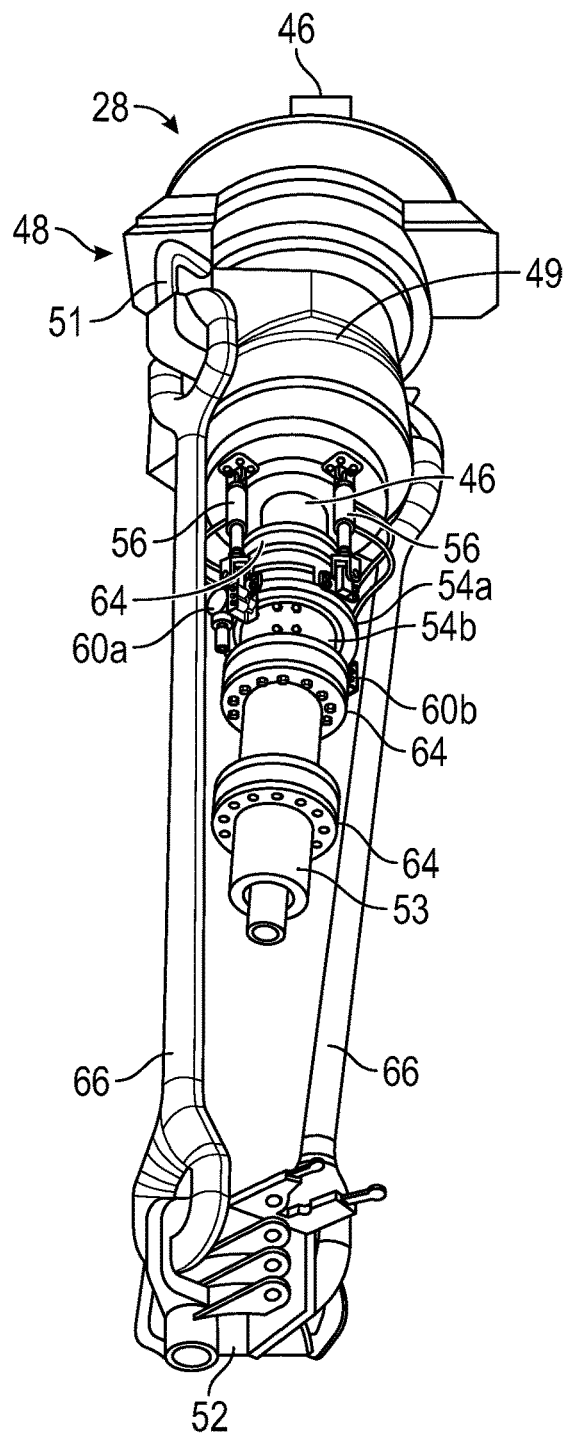
FIGS. 8A and 8B are additional isometric views of certain components of a top drive in retracted and extended positions including an IBOP valve, according to one or more embodiments of the present disclosure.
Figure 8B:
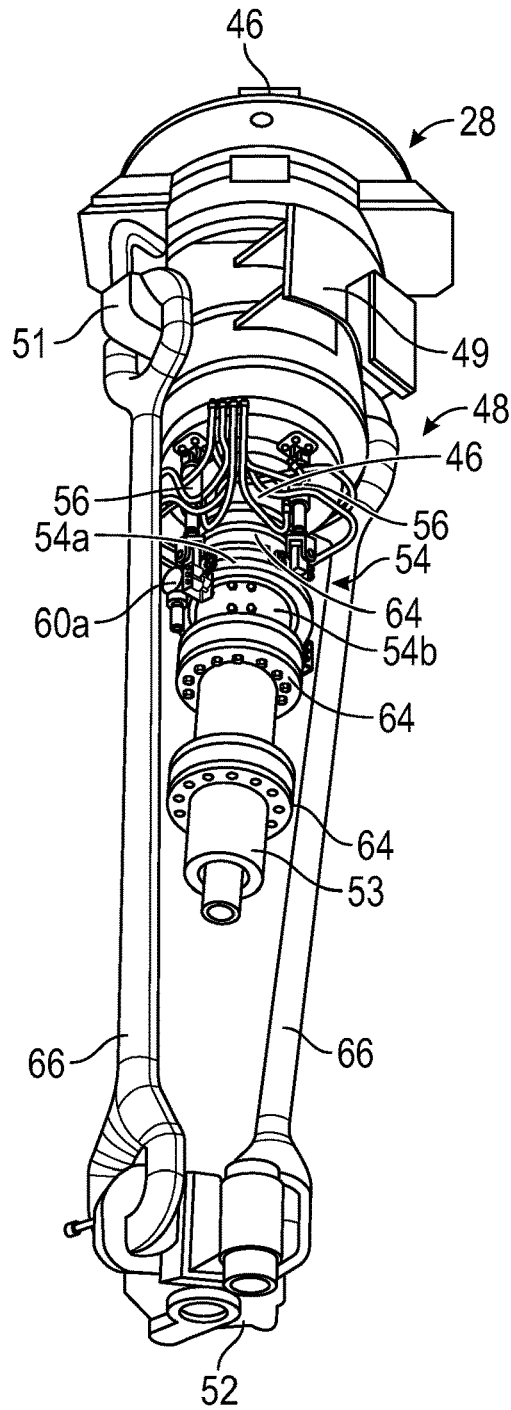

To provide additional views to facilitate understanding of one or more embodiments of the present disclosure, FIGS. 6A, 6B, 7A, 7B, 8A, and 8B show different isometric views of certain components of the top drive 28, as previously described in view of FIGS. 3A, 3B, 4A, and 4B for example. Specifically, FIGS. 6A and 6B show an isometric view of the top drive 28 in a retracted position and an extended position, respectively. FIGS. 7A and 7B show a different isometric view of the top drive 28 in a retracted position and an extended position, respectively. Finally, FIGS. 8A and 8B show a still different isometric view of the top drive 28 in a retracted position and an extended position, respectively. With respect to FIGS. 6A, 6B, 7A, 7B, 8A, and 8B, like components of the top drive 28 are labeled with like reference numerals, as previously described.

Figure 9A:
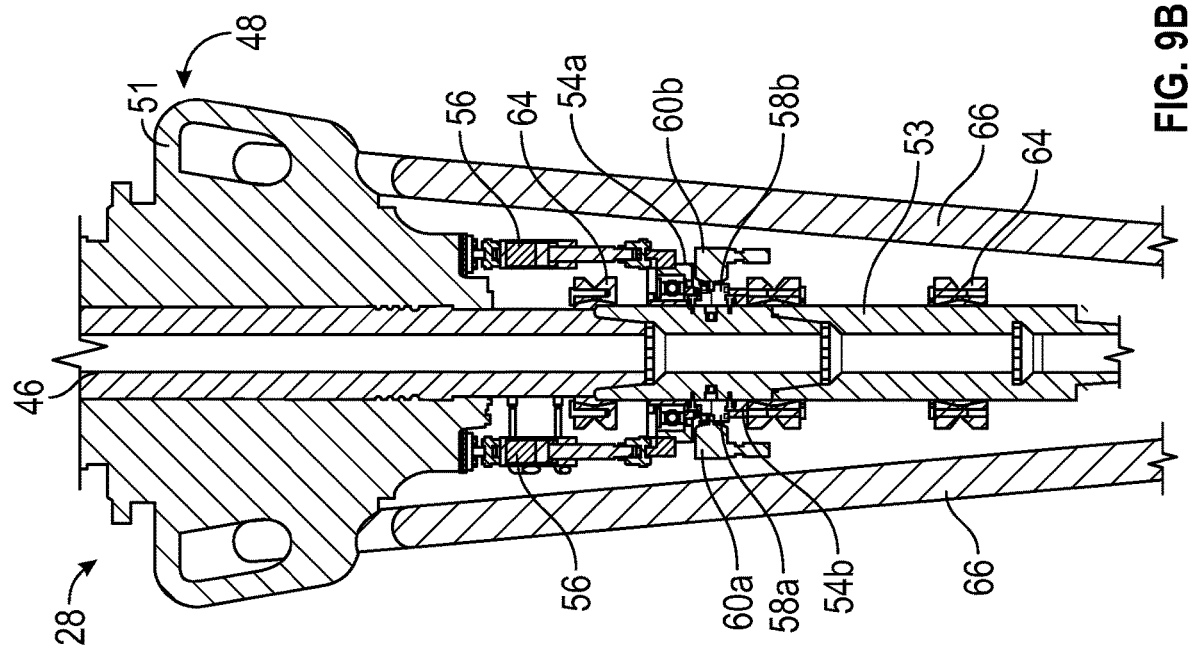
FIGS. 9A and 9B are section views of certain components of a top drive in retracted and extended positions including an IBOP valve, according to one or more embodiments of the present disclosure.
Figure 9B:
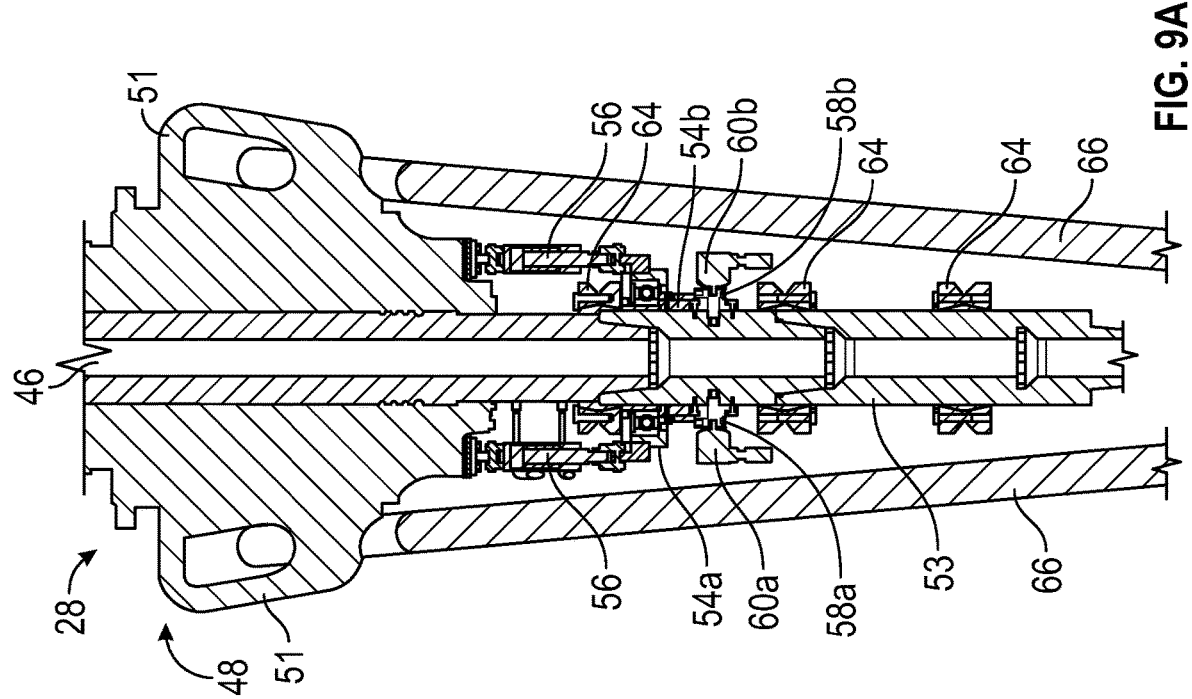

For additional perspective, FIGS. 9A and 9B provide partial section views of certain components of a top drive 28 according to one or more embodiments of the present disclosure. Specifically, FIG. 9A shows the top drive 28 in a retracted position, and FIG. 9B shows the top drive 28 in an extended position, as further described below. With respect to FIGS. 9A and 9B, like components of the top drive 28 are labeled with like reference numerals, as previously described. Moreover, FIGS. 9A and 9B also show that the top drive 28 includes left hand and right hand crank assemblies 58a, 58b having the left and right wireless encoders 60a, 60b connected thereto. According to one or more embodiments of the present disclosure, the crank assemblies 58a, 58b with the wireless encoders 60a, 60b are attached to, and are configured to rotate with, the internal blowout preventer valve 53 along with the rotating portion 54b of the two-piece actuator sleeve assembly 54, as further described below.

FIGS. 10A and 10B provide zoomed in views of the partial section views of certain components of the top drive 28 shown in FIGS. 9A and 9B, according to one or more embodiments of the present disclosure. In this way, FIGS. 10A and 10B provide additional detail regarding the certain components of the top drive 28, as previously described. Specifically, FIG. 10A shows the top drive 28 in a retracted position, and FIG. 10B shows the top drive 28 in an extended position, as further described below. With respect to FIGS. 10A and 10B, like components of the top drive 28 are labeled with like reference numerals, as previously described.

Figure 11:
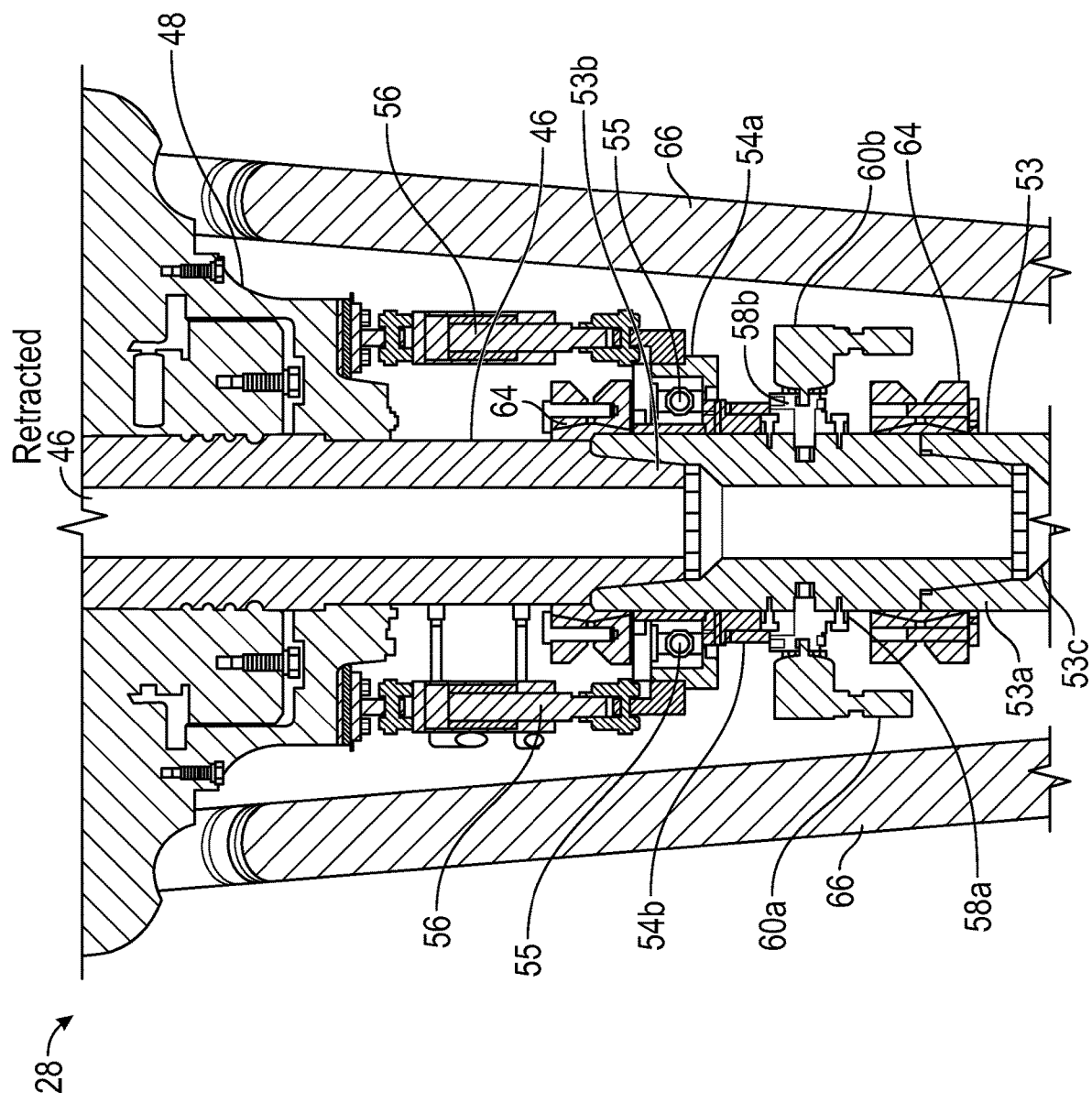
FIG. 11 shows a detailed, zoomed in section view of certain components of a top drive in a retracted position including an IBOP valve, according to one or more embodiments of the present disclosure.

FIG. 11 provides a further zoomed in view of certain components of the top drive 28 with the top drive 28 in the retracted position, as shown in FIG. 10A. With respect to FIG. 11, like components of the top drive 28 are labeled with like reference numerals, as previously described. As further shown, FIG. 11 shows a detailed view of a bearing 55 disposed between the non-rotating portion 54a and the rotating portion 54b of the two-piece actuator sleeve assembly 54, according to one or more embodiments of the present disclosure. Due to this configuration, the bearing allows relative motion with respect to certain components of the top drive 28 since the hydraulic cylinders 56 are unable to rotate.

Figure 12B:
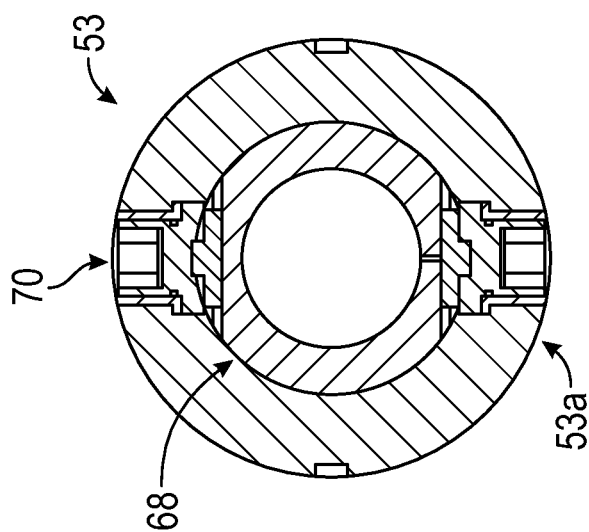
FIGS. 12A-12C show a general arrangement of the IBOP valve, according to one or more embodiments of the present disclosure.
Figure 12C:
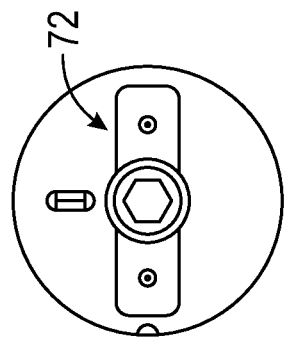
Figure 12A:
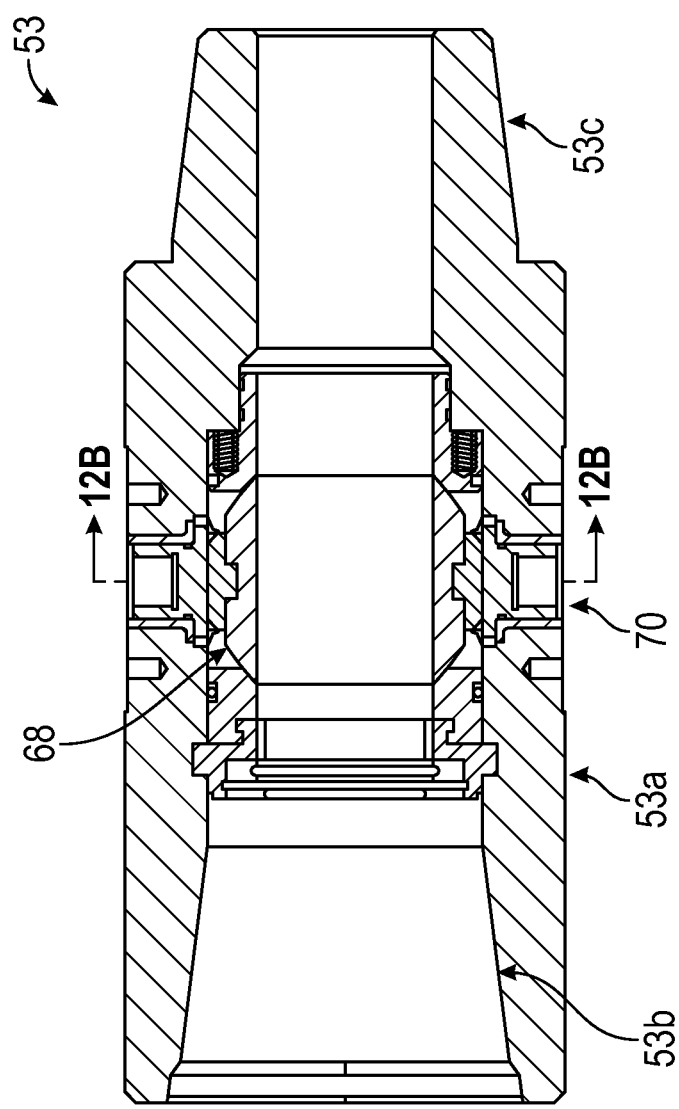

Further, FIG. 11 more clearly shows the main shaft 46 of the top drive 28 engaged with the IBOP valve 53. Referring now to FIGS. 12A to 12C, a general arrangement of the IBOP valve 53 according to one or more embodiments of the present disclosure is shown. Specifically, FIG. 12A shows a section view of the IBOP valve 53, which includes a valve body 53a, a box connection end 53b, a pin connection end 53c, a ball valve 68, and a ball valve crank 70. FIG. 12B shows the IBOP valve 53 of FIG. 12A along line 12B-12B, and FIG. 12C shows the IBOP actuator crank interface 72, according to one or more embodiments of the present disclosure. As shown in FIG. 11, the main shaft 46 of the top drive 28 engages the box connection end 53b of the IBOP valve 53. In view of FIGS. 11, 12A, 12B, and 12C, crank assemblies 58a, 58b may fit into the ball valve cranks 70 of the IBOP valve 53 via the IBOP actuator crank interfaces 72. In this way, the crank assemblies 58a, 58b of the top drive 28 are able to interface with the ball valve 68 inside the body 53a of the IBOP valve 53, according to one or more embodiments of the present disclosure. As also shown in FIG. 11, the left hand crank assembly 58a has a left wireless encoder 60a connected thereto, and the right hand crank assembly 58b has a right wireless encoder 60b connected thereto.

Referring now to FIGS. 13A and 13B, zoomed in section views of axial and rotational movement of certain components of the top drive 28 are shown, according to one or more embodiments of the present disclosure. In FIGS. 13A and 13B, the links 66 of the top drive 28 are removed for the sake of clarity. According to one or more embodiments of the present disclosure, the two-piece actuator sleeve assembly 54 includes a non-rotating portion 54a and a rotating portion 54b, as previously described. Due to this configuration, when the main shaft 46 of the top drive 28 rotates, the IBOP valve 53 rotates, and the rotating portion 54b of the two-piece actuator sleeve assembly 54 also rotates, as shown in FIGS. 13A and 13B. As further shown in FIGS. 13A and 13B, the top drive 28 also includes hydraulic cylinders 56 connected to the main body 49 of the handling ring assembly 48 and connected to the two-piece actuator sleeve assembly 54, according to one or more embodiments of the present disclosure. By retracting and extending, the hydraulic cylinders 56 actuate the two-piece actuator sleeve assembly 54, which allows the top drive 28 to assume the different retracted and extended positions shown in FIGS. 13A and 13B, respectively. For example, the hydraulic cylinders 56 may be connected to a hydraulic system of the top drive 28, which feeds into a distribution system for supplying hydraulic fluid to the hydraulic cylinders 56. In this way, applying hydraulic pressure near the top of the hydraulic cylinders 56 causes the hydraulic cylinders 56 to retract, which causes the two-piece actuator sleeve assembly 54 connected to the hydraulic cylinders 56 to move axially upward along a longitudinal axis of the IBOP valve 53, which results in the top drive 28 assuming the retracted position shown in FIG. 13A. Further, applying hydraulic pressure near the bottom of the hydraulic cylinders 56 causes the hydraulic cylinders 56 to extend, which causes the two-piece actuator sleeve assembly 54 connected to the hydraulic cylinders 56 to move axially downward along the longitudinal axis of the IBOP valve 53, which results in the top drive 28 assuming the extended position shown in FIG. 13B. This axial movement of the two-piece actuator sleeve assembly 54 either up or down along the longitudinal axis of the IBOP valve 53 may occur as the main shaft 46 and the IBOP valve 53 of the top drive 28 rotate, for example. Specifically, this axial movement of the two-piece actuator sleeve assembly 54 includes the non-rotating portion 54a moving axially along the longitudinal axis of the IBOP valve 53, and the rotating portion 54b moving axially along the longitudinal axis of the IBOP valve 53, along with the non-rotating portion 54a, as the rotating portion 54b continues to rotate.

Still referring to FIGS. 13A and 13B, the crank assemblies 58a, 58b, which interface with the ball valve 68 inside the body 53a of the IBOP valve 53, and which are attached to the rotating portion 54b of the two-piece actuator sleeve assembly 54, rotate to shift a position of the ball valve 68 inside the body 53a of the IBOP valve 53. For example, when the hydraulic cylinders 56 are retracted, as shown in FIG. 13A, the crank assemblies 58a, 58b may be rotated in a direction so as to shift the position of the ball valve 68 inside the IBOP valve 53 to a closed position. Further, when the hydraulic cylinders 56 are extended, as shown in FIG. 13B, the crank assemblies 58a, 58b may be rotated 90° in a second direction so as to shift the position of the ball valve 68 inside the IBOP valve 53 from the closed position to an open position.

Referring now to FIGS. 14A to 14E, different views of a left crank assembly 58a according to one or more embodiments of the present disclosure, as shown in the top drive 28 of FIGS. 13A and 13B, for example, are shown. Specifically, FIG. 14A shows a perspective view of the left crank assembly 58a rotated in a first direction, which may be a closed position, according to one or more embodiments of the present disclosure, for example. Further, FIG. 14B shows a partial cutaway view of the left crank assembly 58a shown in FIG. 14A, according to one or more embodiments of the present disclosure. Specifically, FIG. 14B shows that the left crank assembly 58a may include a crank body 57a, a crank handle 57b, a crank shaft 57c, a cam follower 57d, at least one O-ring 57e, a retaining ring 57f, and a needle bearing 57g, according to one or more embodiments of the present disclosure. Although not shown, the corresponding right crank assembly 58b may include similar components, according to one or more embodiments of the present disclosure. FIG. 14C shows a perspective view of the left crank assembly 58a rotated in a second direction, which may be an open position, for example, according to one or more embodiments of the present disclosure. Finally, FIGS. 14D and 14E show bottom perspective views of the left crank assembly 58a rotated in the first direction and the second direction, respectively, according to one or more embodiments of the present disclosure.

Referring back to FIGS. 13A and 13B, a left wireless encoder 60a is connected to the left hand crank assembly 58a via a left crank/encoder interface 59a, and a right wireless encoder 60b is connected to the right hand crank assembly 58b via a right crank/encoder interface 59b. That is, in a system according to one or more embodiments of the present disclosure, two crank assemblies 58a, 58 are used and two wireless encoders 60a, 60b are provided, which has several advantages for the system including redundant measurement, the ability to detect a deviation (e.g., a crank assembly becoming damaged or inoperable), and the ability to safely apply a greater torque with which to open and close the IBOP valve 53. As further shown in FIGS. 13A and 13B, the wireless encoders 60a, 60b are encased in left and right guards or covers 62a, 62b, as previously described. As the rotating portion 54b of the two-piece actuator sleeve assembly 54 rotates and moves axially along the longitudinal axis of the IBOP valve 53, as previously described, the left and right guards or covers 62a, 62b also move axially and rotate, according to one or more embodiments of the present disclosure.

Figure 15A:
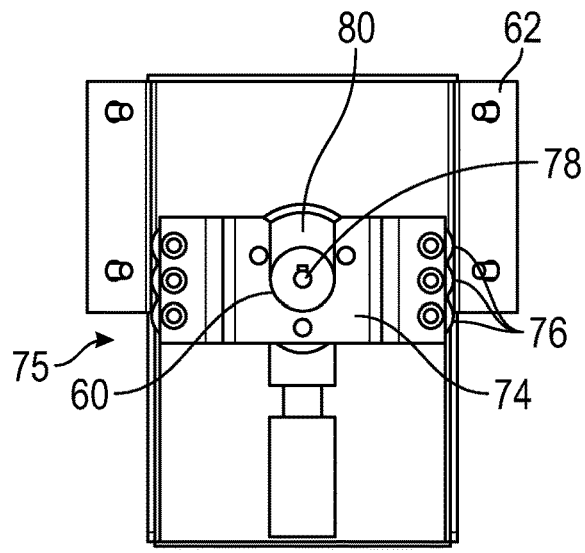
FIGS. 15A and 15B show front and perspective views of an encoder assembly within a guard, according to one or more embodiments of the present disclosure.
Figure 15B:
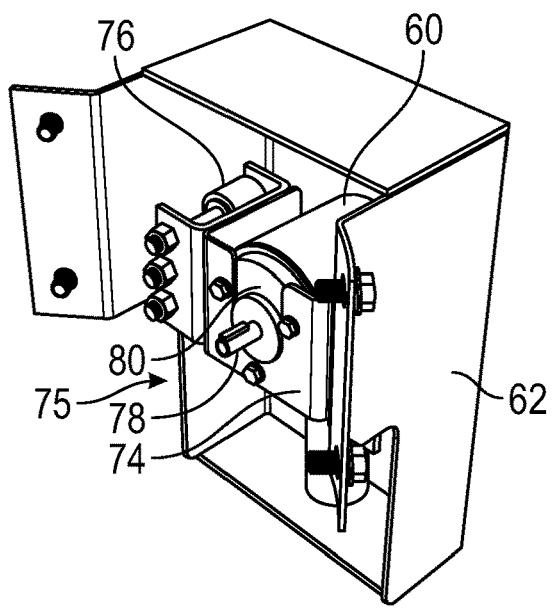
Figure 15C:
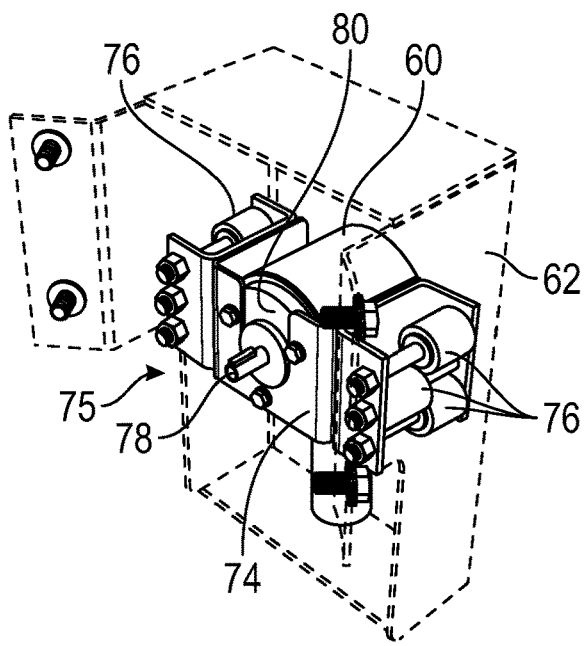
FIG. 15C shows a detailed perspective view of an encoder assembly within a transparent guard, according to one or more embodiments of the present disclosure.
Figure 15D:
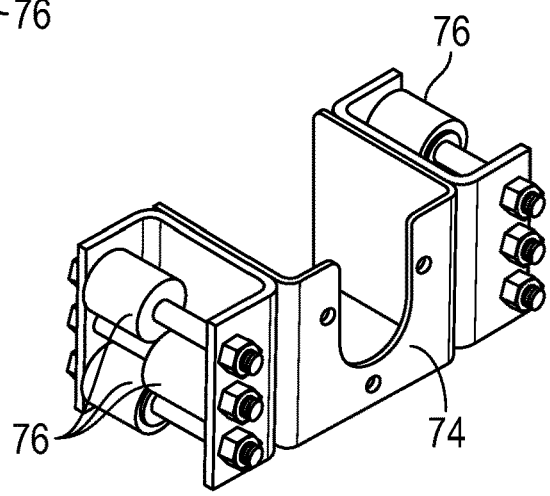
FIG. 15D shows a perspective view of an anti-rotation bracket with rollers of an encoder assembly, according to one or more embodiments of the present disclosure.

Referring now to FIGS. 15A and 15B, front and perspective views of an encoder assembly 75 encased within a protective guard or cover 62 are shown, according to one or more embodiments of the present disclosure. As shown in FIGS. 15A and 15B, the encoder assembly 75 includes a wireless encoder 60 coupled with an anti-rotation bracket 74. As also shown in FIGS. 15A and 15B, the wireless encoder 60 includes a shaft 78, which is configured to rotate, and a housing 80, which is relatively fixed. FIG. 15C shows a perspective view of the encoder assembly 75 encased within a transparent guard or cover 62, which shows more details of the wireless encoder 60 coupled to the anti-rotation bracket 74. Further, FIG. 15D shows a perspective view of the anti-rotation bracket 74 alone. As shown in FIGS. 15A to 15D, the anti-rotation bracket 74 includes a plurality of rollers 76. Referring back to FIGS. 13A and 13B, the plurality of rollers 76 of the anti-rotation bracket 74 facilitates axial movement of the protective guard or cover 62 relative to the wireless encoder 60 coupled with the anti-rotation bracket 74.

Still referring to FIGS. 13A and 13B, as the crank assemblies 58a, 58b rotate, e.g., 90° as previously described, the shaft 78 of the wireless encoders 60a, 60b also rotates in the same direction while the housing 80 of the wireless encoders 60a, 60b remains fixed. Moreover, the anti-rotation bracket 74 with the rollers 76 stay in the same relative position with the corresponding wireless encoders 60a, 60b. With the rotation of the shaft 78 as previously described, the wireless encoders 60a, 60b generate a plurality of measurements corresponding to the number of counts in each direction when the IBOP valve 53 is actuated. According to one or more embodiments of the present disclosure, a processing device 192, such as that shown and described with respect to FIG. 1, is communicatively connected with the wireless encoders 60a, 60b, receives the plurality of measurements from the wireless encoders 60a, 60b, and calculates an instantaneous position measurement of the IBOP valve 53 based on the plurality of measurements, as further described below. In this way, because the wireless encoders 60a, 60b generate the plurality of measurements corresponding to the number of counts in each direction when the IBOP valve 53 is actuated, the wireless encoders 60a, 60b are configured to provide an instantaneous position measurement of the IBOP valve 53, as further described below.

According to one or more embodiments of the present disclosure, the wireless encoders 60a, 60b may be powered by a battery. Moreover, the wireless encoders 60a, 60b according to one or more embodiments of the present disclosure are configured to operate in hazardous areas, as recognized by those having skill in the relevant art.

Figure 16A:
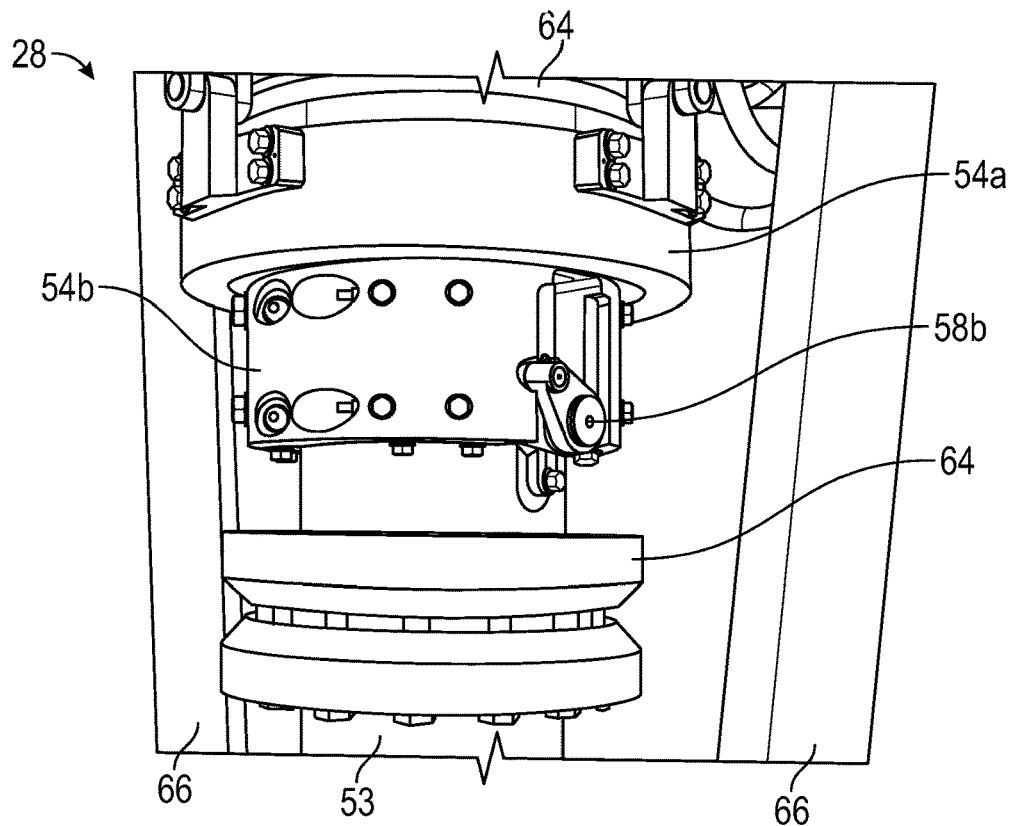
FIGS. 16A and 16B show zoomed in partial views of certain components of a top drive including a crank valve in open and closed positions, according to one or more embodiments of the present disclosure.
Figure 16B:
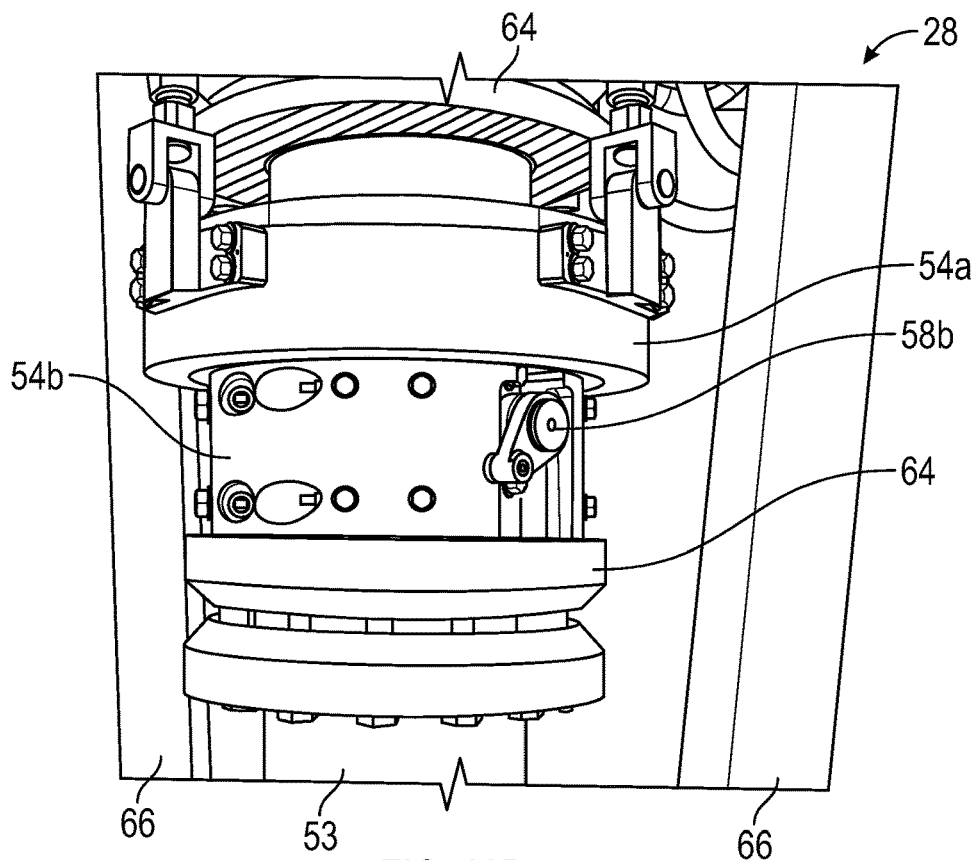

Referring now to FIGS. 16A and 16B, zoomed in partial views of certain components of a top drive 28, according to one or more embodiments of the present disclosure, are shown. For the sake of clarity, wireless encoders 60a, 60b and corresponding guards or covers 62a, 62b have been removed in FIGS. 16A and 16B, so that the left crank valve 58b, as previously described, is more visible. Specifically, FIG. 16A shows the top drive 28 in a retracted position with the left crank valve 58b in a closed position. Due to this configuration, the IBOP valve 53 shown in FIG. 16A is also closed. Further, FIG. 16B shows the top drive 28 in an extended position with the left crank valve 58b in an open position. Due to this configuration, the IBOP valve 53 shown in FIG. 16B is also closed. With respect to FIGS. 16A and 16B, like components of the top drive 28 are labeled with like reference numerals, as previously described.

Figure 17A:
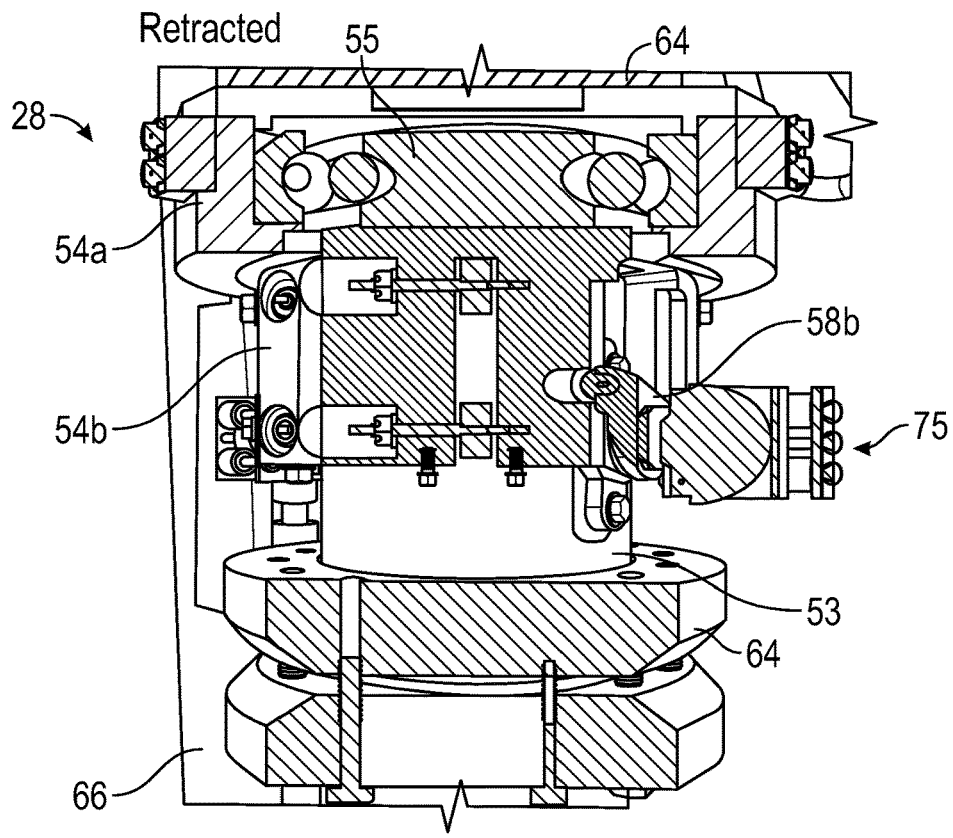
FIGS. 17A and 17B show zoomed in partial, angled cutaway views of certain components of a top drive including a bearing carrier roller feature, according to one or more embodiments of the present disclosure.
Figure 17B:
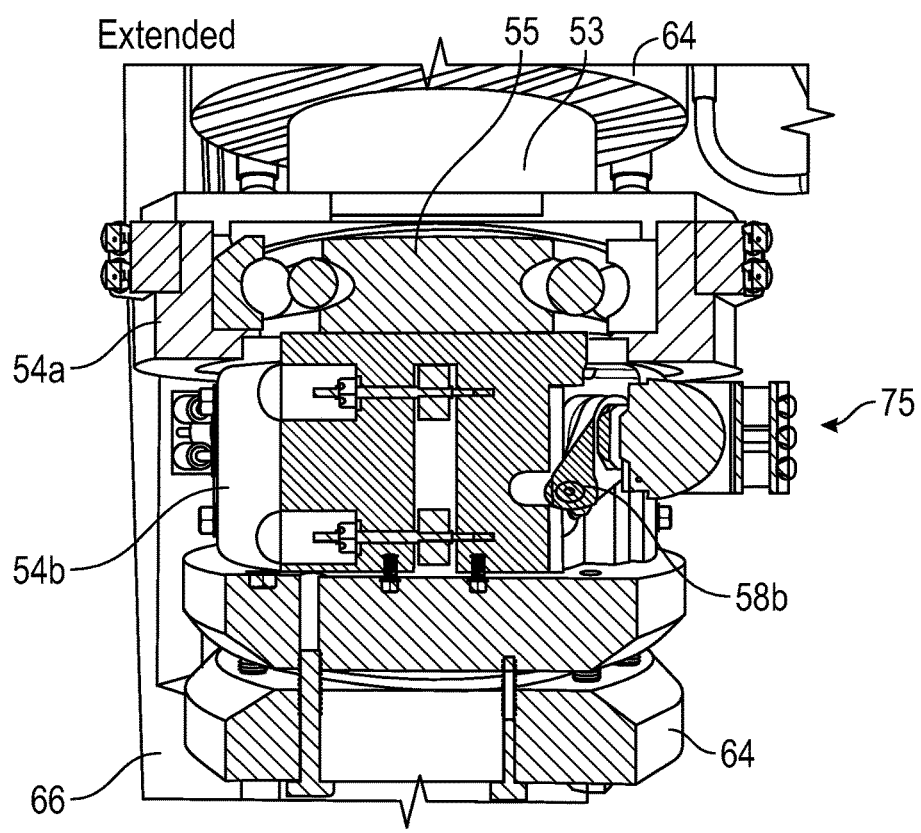

Referring now to FIGS. 17A and 17B, zoomed in partial, angled cutaway views of certain components of a top drive 28 according to one or more embodiments of the present disclosure are shown. Specifically, FIGS. 17A and 17B show the bearing 55 between the non-rotating portion 54a and the rotating portion 54b of the two-piece actuator sleeve assembly 54, as previously described. Moreover, FIGS. 17A and 17B show the encoder assembly 75 connected to the left crank assembly 58b, as previously described. Specifically, FIG. 17A shows the top drive 28 in a retracted position with the left crank valve 58b in a closed position. Due to this configuration, the IBOP valve 53 shown in FIG. 17A is also closed. Further, FIG. 17B shows the top drive 28 in an extended position with the left crank valve 58b in an open position. Due to this configuration, the IBOP valve 53 shown in FIG. 17B is also open. With respect to FIGS. 17A and 17B, like components of the top drive 28 are labeled with like reference numerals, as previously described.

Figure 18B:
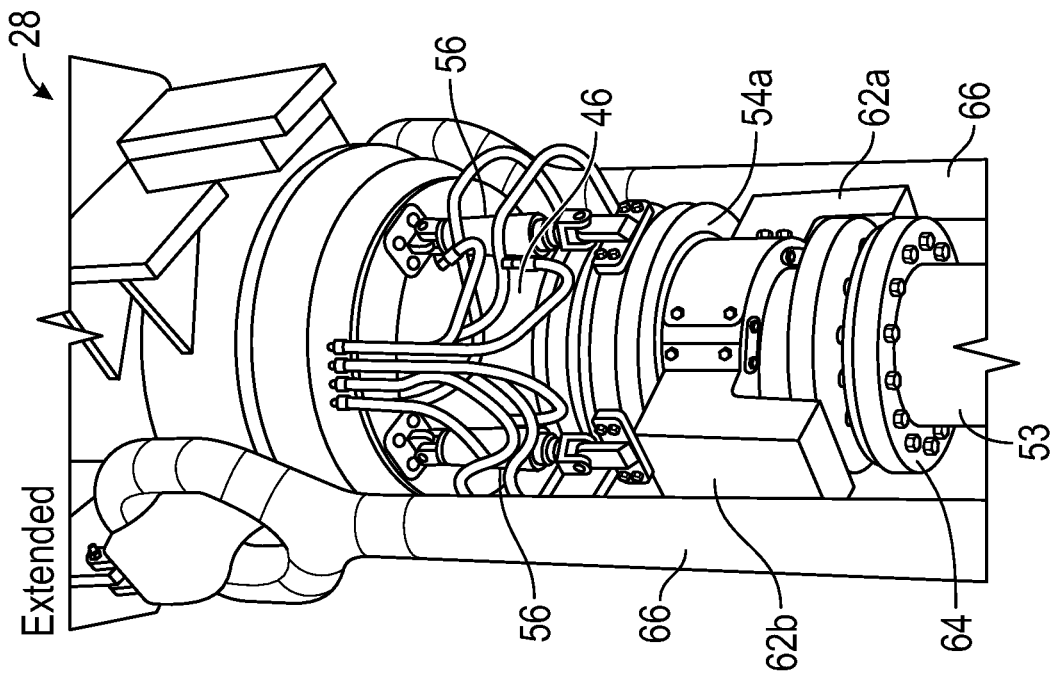
FIGS. 18A and 18B show zoomed in partial views of certain components of a top drive including a crank/encoder guard, according to one or more embodiments of the present disclosure.
Figure 18A:
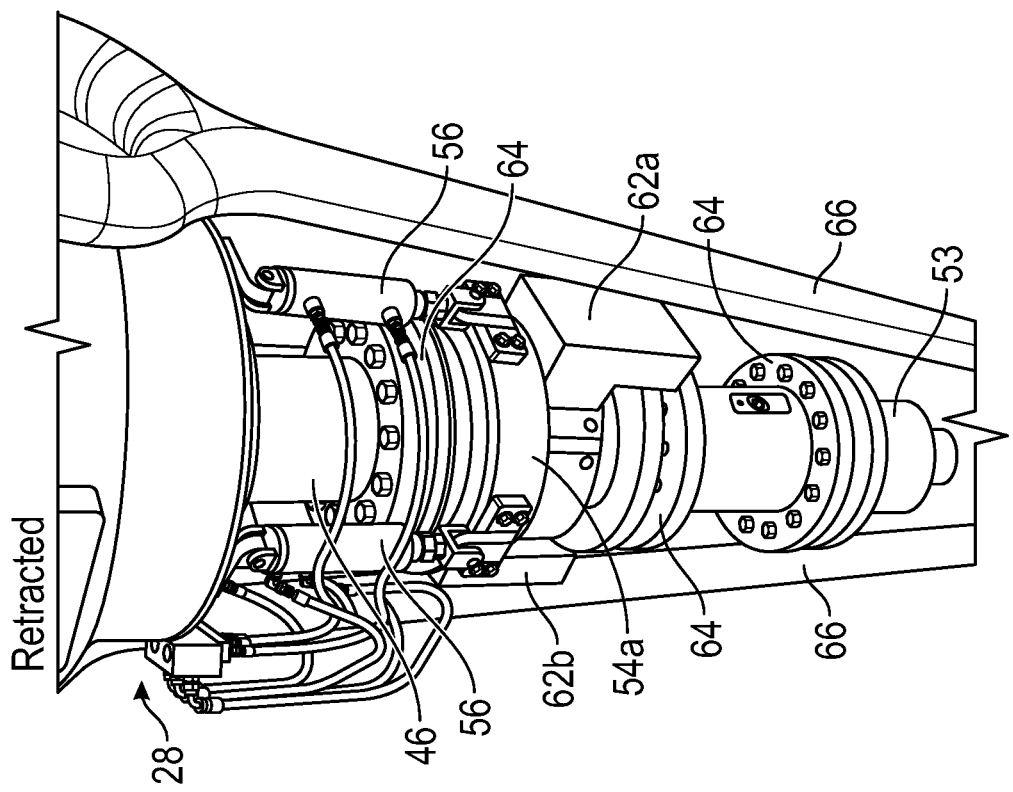

Referring now to FIGS. 18A and 18B, zoomed in partial views of certain components of a top drive 28 according to one or more embodiments of the present disclosure are shown. Specifically, FIGS. 18A and 18B show the protective guard or cover 62a, 62b over the crank valve 58a, 58b and the corresponding encoder assemblies 75, for example. Moreover, FIG. 18A shows the top drive 28 in a retracted position, and FIG. 18B shows the top drive 28 in an extended position, as previously described. With respect to FIGS. 18A and 18B, like components of the top drive 28 are labeled with like reference numerals, as previously described.

Figure 19B:
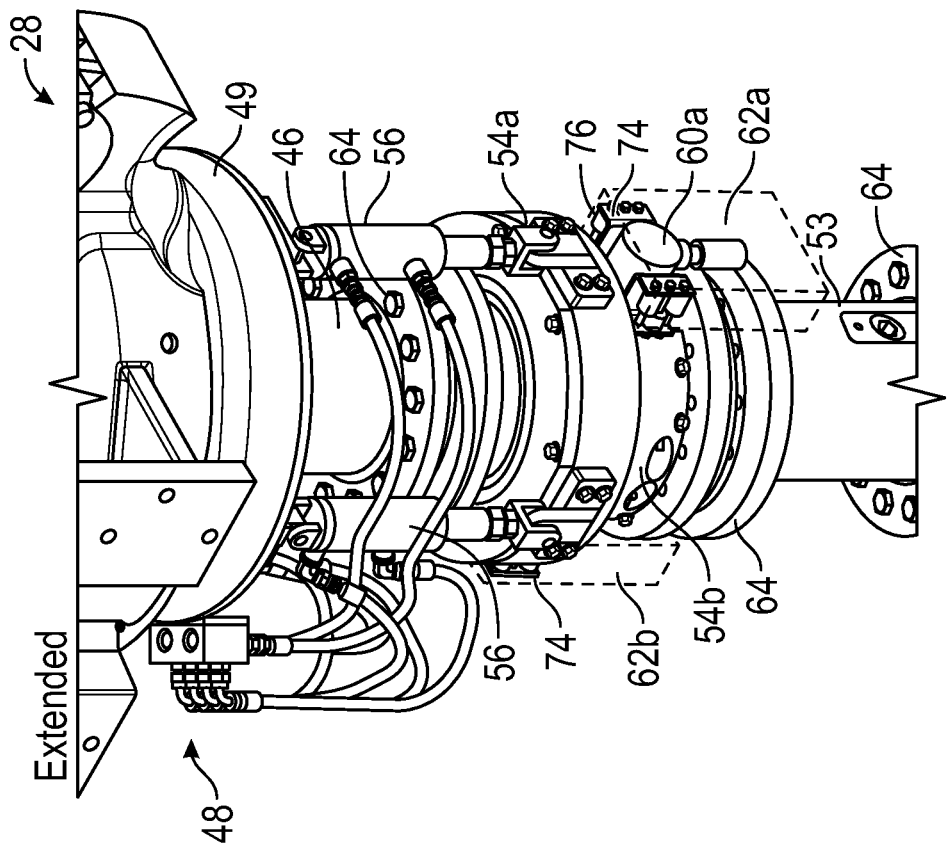
FIGS. 19A and 19B show zoomed in partial views of certain components of the top drive as shown in FIGS. 18A and 18B with the links removed and the encoder guards transparent for better visibility, according to one or more embodiments of the present disclosure.
Figure 19A:
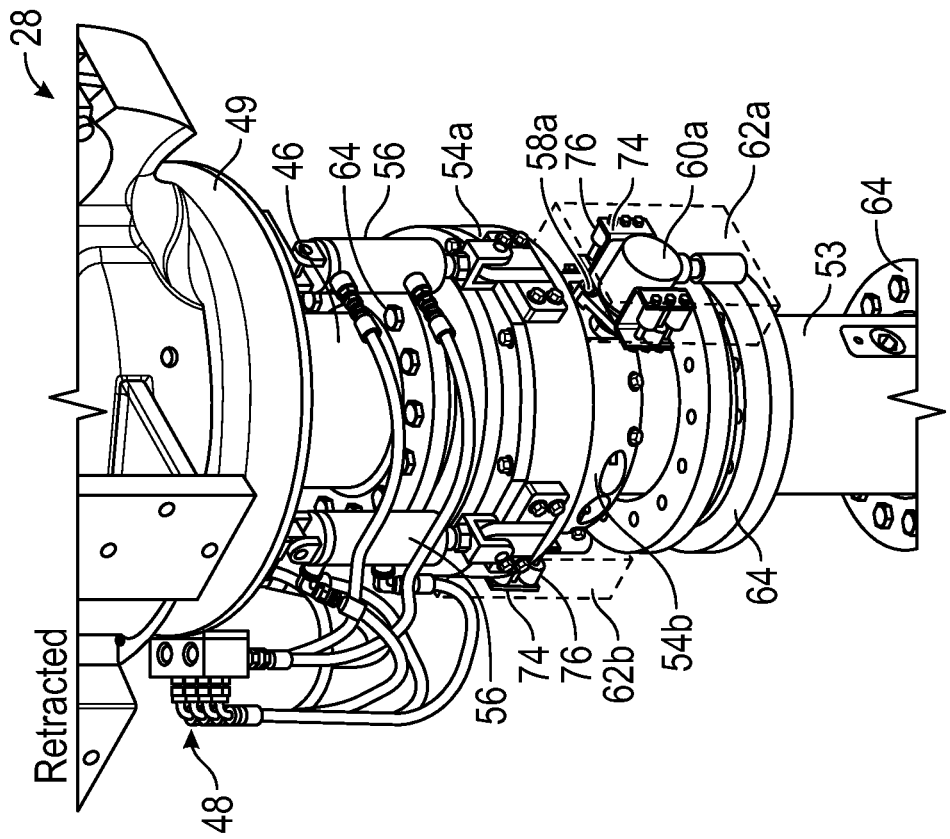

Referring now to FIGS. 19A and 19B, zoomed in partial views of certain components of the top drive 28 as shown in FIGS. 18A and 18B, with links 66 removed and the encoder guards or covers 62a, 62b transparent for better visibility, according to one or more embodiments of the present disclosure, are shown. Moreover, FIG. 19A shows the top drive 28 in a retracted position, and FIG. 19B shows the top drive 28 in an extended position as previously described. With respect to FIGS. 19A and 19B, like components of the top drive 28 are labeled with like reference numerals, as previously described.

As previously described, a processing device 192 communicatively connected with wireless encoders 60a, 60b receives a plurality of measurements from the wireless encoders 60a, 60b, and calculates an instantaneous position measurement of the IBOP valve 53 based on the plurality of measurements, according to one or more embodiments of the present disclosure. An HMI may visually display position measurement data calculated by the processing device 192, according to one or more embodiments of the present disclosure. More specifically, the processing device 192 may determine an operating extent of the IBOP valve 53 based on the instantaneous position measurement of the IBOP valve 53, according to one or more embodiments of the present disclosure. Moreover, the determined operating extent of the IBOP valve 53 may be displayed on a screen of an HMI, such as in a driller's control room, and/or on a driller's chair, according to one or more embodiments of the present disclosure.

Figure 20A:
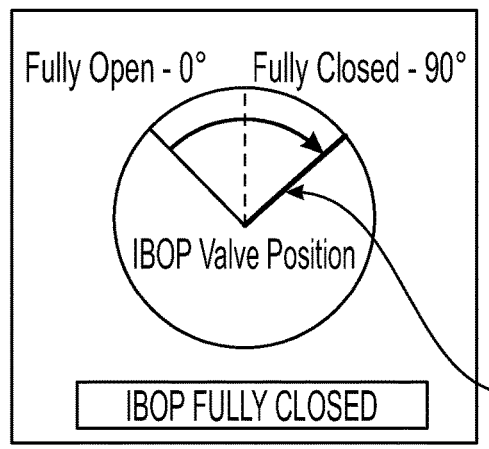
FIGS. 20A and 20B show human machine interface (HMI) images of IBOP fully closed and fully open positions, according to one or more embodiments of the present disclosure.

Referring now to FIGS. 20A, 20B, 21A, 21B, 22A, 22B, 23A, and 23B, various HMI images representative of the IBOP valve 53 according to one or more embodiments of the present disclosure are shown. Specifically, FIG. 20A shows an HMI image, which may be displayed on a screen, for example, of a new IBOP valve 53, which is properly set up and adjusted, in a fully closed position. Indeed, the HMI image of FIG. 20A indicates that the IBOP valve 53 has rotated the full 90°, via full rotation of the crank valve, as previously described, to assume the fully closed position. Moreover, because the IBOP valve 53 represented in FIG. 20A is a new valve, the operating extent of the IBOP valve 53 is at full capacity.

Figure 20B:
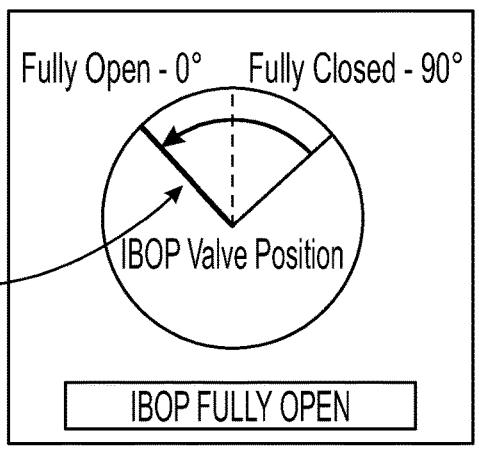

Further, FIG. 20B shows an HMI image of a new IBOP valve 53, which is properly set up and adjusted, in a fully open position. Indeed, the HMI image of FIG. 20B indicates that the IBOP valve 53 has rotated the full 90° in the opposite direction to that shown in FIG. 20A, via full rotation of the crank valve, as previously described, to assume the fully open position. Moreover, because the IBOP valve 53 represented in FIG. 20B is a new valve, the operating extent of the IBOP valve 53 is at full capacity.

Figure 21A:
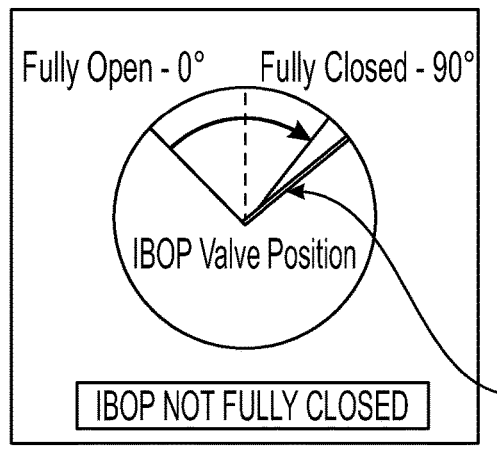
FIGS. 21A and 21B show HMI images of IBOP not fully closed and not fully open positions, according to one or more embodiments of the present disclosure.
Figure 21B:
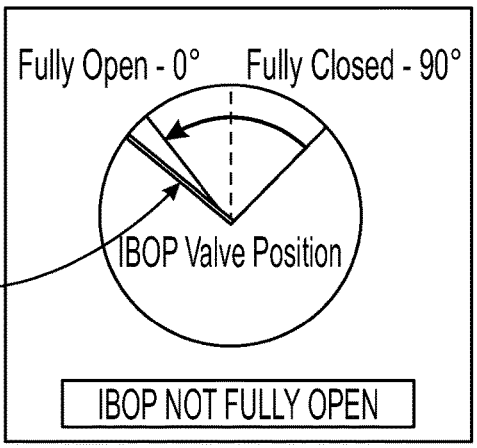

FIG. 21A shows an HMI image of a new IBOP valve 53, which is properly set up and adjusted, in a partially closed position. FIG. 21B shows an HMI image of a new IBOP valve 53, which is properly set up and adjusted, in a partially open position. Indeed, the HMI image of FIG. 21A indicates that the IBOP valve 53 has not rotated the full 90° in order to be fully closed, and the HMI image of FIG. 21B indicates that the IBOP valve 53 has not rotated the full 90° in the opposite direction in order to be fully opened. Instead, the IBOP valve 53 is indicated to have assumed a not fully closed position (FIG. 21A), and a not fully open position (FIG. 21B). According to one or more embodiments of the present disclosure, the system may generate an alarm upon a determination that the IBOP valve 53 is not fully closed or not fully opened.

Figure 22A:
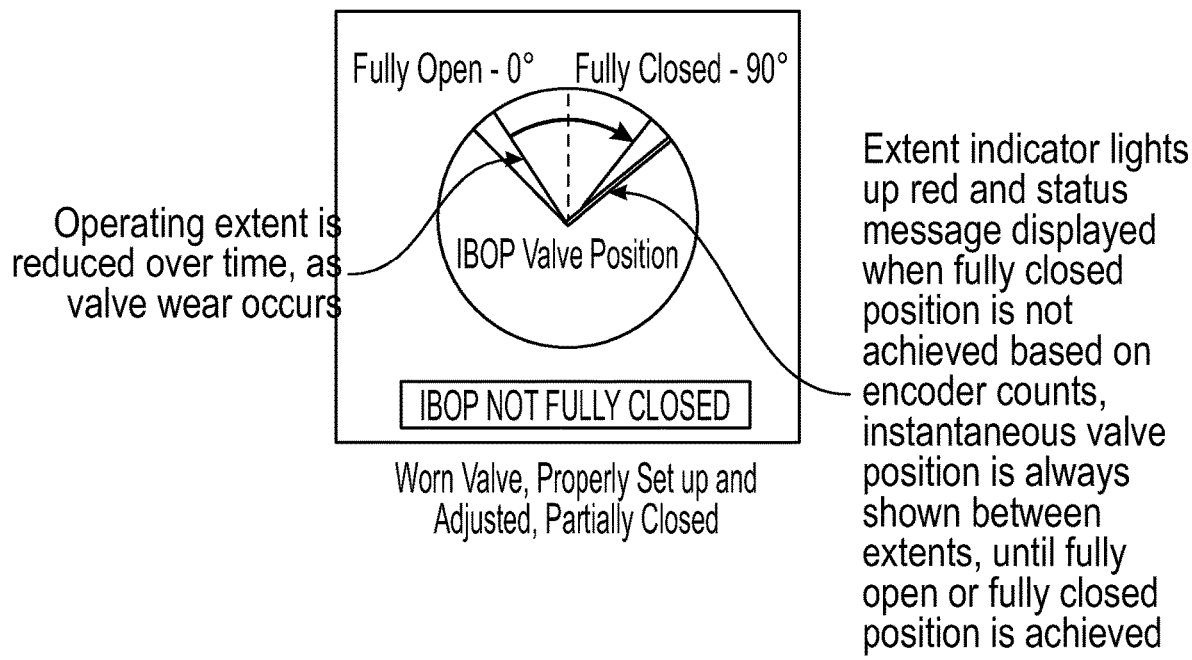
FIGS. 22A and 22B show HMI images of IBOP not fully closed and not fully open positions along with a depiction of reduction of the operating extent of the IBOP valve over time, according to one or more embodiments of the present disclosure.
Figure 22B:
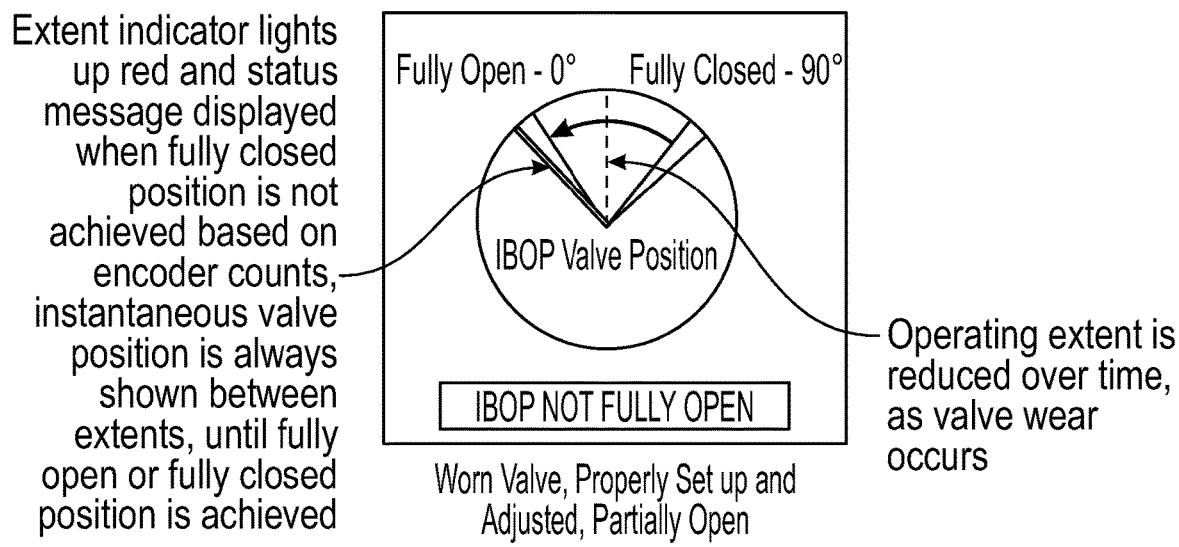

FIG. 22A shows an HMI image of a worn IBOP valve 53, which is properly set up and adjusted, in a partially closed position. FIG. 22B shows an HMI image of a worn IBOP valve 53, which is properly set up and adjusted, in a partially open position. Indeed, the HMI image of FIG. 22A indicates that the IBOP valve 53 has not rotated the full 90° in order to be fully closed, and the HMI image of FIG. 22B indicates that the IBOP valve 53 has not rotated the full 90° in the opposite direction in order to be fully opened. Instead, the IBOP valve 53 is indicated to have assumed a not fully closed position (FIG. 22A), and a not fully open position (FIG. 22B). Moreover, the HMI images of FIGS. 22A and 22B indicate that the operating extent of the IBOP valve 53 has reduced over time, as valve wear occurs. According to one or more embodiments of the present disclosure, the processing device 192 may determine the operating extent of the IBOP valve 53 based on the instantaneous position measurement of the IBOP valve 53. Moreover, the processing device 192 may track the instantaneous position measurement of the IBOP valve 53 over a period of time, and determine a condition of the IBOP valve 53 based on the instantaneous position measurement tracked over the period of time, according to one or more embodiments of the present disclosure.

Figure 23A:
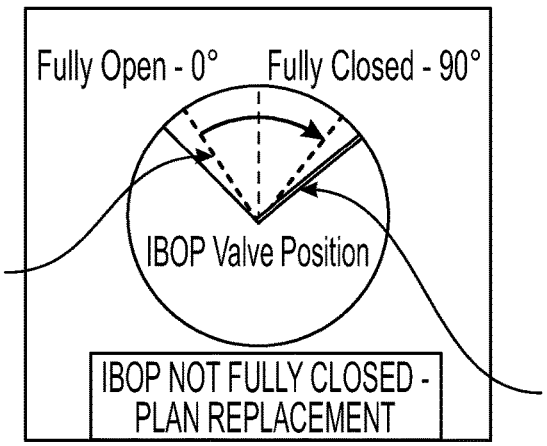
FIGS. 23A and 23B show HMI images of IBOP not fully closed and not fully open positions along with a depiction of reduction of the operating extent of the IBOP valve such that replacement is required, according to one or more embodiments of the present disclosure.
Figure 23B:
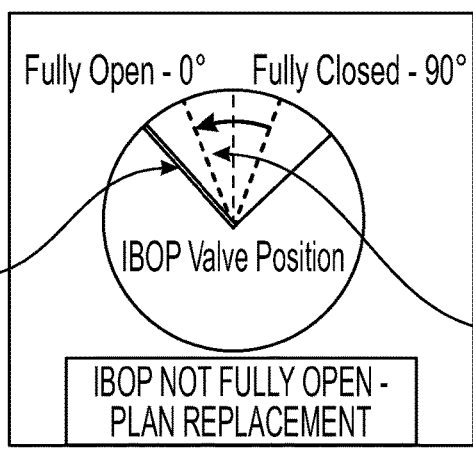

For example, FIG. 23A shows an HMI image of a worn IBOP valve 53, which is properly set up and adjusted, in a partially closed position, for which a replacement threshold has been met for replacing the IBOP valve 53. FIG. 23B shows an HMI image of a worn IBOP valve 53, which is properly set up and adjusted, in a partially open position, for which a replacement threshold has been met for replacing the IBOP valve 53. Indeed, the HMI image of FIG. 23A indicates that the IBOP valve 53 has not rotated the full 90° in order to be fully closed, and the HMI image of FIG. 23B indicates that the IBOP valve 53 has not rotated the full 90° in the opposite direction in order to be fully opened. Instead, the IBOP valve 53 is indicated to have assumed a not fully closed position (FIG. 23A), and a not fully open position (FIG. 23B). Moreover, the HMI images of FIGS. 23A and 23B indicate that the operating extent of the IBOP valve 53 has reduced over time so much that the IBOP valve 53 should be replaced. By the HMI images of FIGS. 23A and 23B showing that the replacement threshold of the IBOP valve 53 has been met, the user is alerted that failure of the IBOP valve 53 is imminent; however, the IBOP valve 53 has not degraded to a point that the valve will no longer hold pressure. Such an alert is advantageous because it affords the user time to plan for replacement of the IBOP valve 53 before the valve completely fails.

Advantageously, systems and methods according to one or more embodiments of the present disclosure enable the addition of an IBOP actuator valve position window to the driller's HMI, the storage and trending of the measurement data, indications of IBOP valve 53 position based on direct position measurement, and the generation of alarms when specified conditions are not achieved (e.g., not fully opened, not fully closed, etc.).

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system, comprising:
    a top drive comprising:
        a handling ring assembly comprising a main body;
        a main shaft that traverses the main body of the handling ring assembly;
        an internal blowout preventer valve, wherein the main shaft engages the internal blowout preventer valve;
        a two-piece actuator sleeve assembly comprising:
            a non-rotating portion; and
            a rotating portion;
        at least one hydraulic cylinder connected to the main body of the handling ring assembly, wherein the at least one hydraulic cylinder actuates the two-piece actuator sleeve assembly;
        a left hand crank assembly having a left wireless encoder connected thereto; and
        a right hand crank assembly having a right wireless encoder connected thereto,
        wherein the crank assemblies with the wireless encoders are attached to, and are configured to rotate with, the internal blowout preventer valve along with the rotating portion of the two-piece actuator sleeve assembly.

2. The system of claim 1, wherein the crank assemblies interface with a ball valve inside a body of the internal blowout preventer valve.

3. The system of claim 1, wherein the wireless encoders are powered by a battery.

4. The system of claim 1, wherein the wireless encoders are configured to provide an instantaneous position measurement of the internal blowout preventer valve.

5. The system of claim 1, wherein each wireless encoder is coupled with an anti-rotation bracket, and wherein each wireless encoder and corresponding anti-rotation bracket is encased in a protective guard.

6. The system of claim 5, wherein the anti-rotation bracket comprises a plurality of rollers, and wherein the plurality of rollers facilitates axial movement of the protective guard relative to the wireless encoder coupled with the anti-rotation bracket.

7. The system of claim 1,
    wherein the left wireless encoder is connected to the left hand crank assembly via a left crank/encoder interface, and
    wherein the right wireless encoder is connected to the right hand crank assembly via a right crank/encoder interface.

8. The system of claim 1, further comprising a bearing disposed between the non-rotating portion and the rotating portion of the two-piece actuator sleeve assembly.

9. The system of claim 1,
    wherein the internal blowout preventer valve comprises: a body; a box connection end; and a pin end, and
    wherein the main shaft engages the box connection end of the internal blowout preventer valve.

10. A method comprising:
    rotating the main shaft of the top drive of claim 1, thereby causing the internal blowout preventer valve and the rotating portion of the two-piece actuator sleeve assembly to rotate;
    applying pressure to the at least one hydraulic cylinder to actuate the two-piece actuator sleeve assembly, wherein actuating the two-piece actuator sleeve assembly comprises:
        moving the non-rotating portion axially along a longitudinal axis of the internal blowout preventer valve; and
        moving the rotating portion axially along the longitudinal axis of the internal blowout preventer valve, along with the non-rotation portion, as the rotating portion continues to rotate;
    rotating the crank assemblies in a first direction to shift a position of the internal blowout preventer valve, wherein, during the rotating step, a shaft of the wireless encoders corresponding to the crank assemblies rotates in the first direction;
    generating a plurality of measurements as the shaft of the wireless encoders rotates in the first direction;
    receiving the plurality of measurements by a processing device;
    calculating an instantaneous position measurement of the internal blowout preventer valve based on the plurality of measurements; and
    determining an operating extent of the internal blowout preventer valve based on the instantaneous position measurement of the internal blowout preventer valve.

11. The method of claim 10, further comprising:
    tracking the instantaneous position measurement of the internal blowout preventer valve over a period of time; and
    determining a condition of the internal blowout preventer valve based on the instantaneous position measurement tracked over the period of time.

12. The method of claim 10, wherein determining the operating extent of the internal blowout preventer valve comprises determining whether the internal blowout preventer valve is fully opened or fully closed.

13. The method of claim 12, further comprising: generating an alarm upon a determination that the internal blowout preventer valve is not fully opened or not fully closed.

14. The method of claim 12, further comprising:
    indicating that the internal blowout preventer valve should be replaced based on the determined operating extent of the internal blowout preventer valve on a screen of a human machine interface.

15. The method of claim 10, further comprising:
displaying the determined operating extent of the internal blowout preventer valve on a screen of a human machine interface.

* * * * *